(12) United States Patent
Rolland et al.

(10) Patent No.: US 8,363,225 B2
(45) Date of Patent: Jan. 29, 2013

(54) OPTICAL COHERENCE TOMOGRAPHY (OCT) APPARATUS, METHODS, AND APPLICATIONS

(75) Inventors: Jannick P. Rolland, Pittsford, NY (US); Kye-Sung Lee, Rochester, NY (US); Panomsak Meemon, Rochester, NY (US)

(73) Assignee: University of Rochester, Rochester, NY (US)

( * ) Notice: Subject to any disclaimer, the term of this patent is extended or adjusted under 35 U.S.C. 154(b) by 60 days.

(21) Appl. No.: 13/006,535

(22) Filed: Jan. 14, 2011

(65) Prior Publication Data

US 2011/0170111 A1 Jul. 14, 2011

Related U.S. Application Data

(60) Provisional application No. 61/294,903, filed on Jan. 14, 2010.

(51) Int. Cl.
*G01B 11/02* (2006.01)

(52) U.S. Cl. .................................. 356/479; 356/497

(58) Field of Classification Search .................. 356/497
See application file for complete search history.

(56) References Cited

U.S. PATENT DOCUMENTS

| | | | | |
|---|---|---|---|---|
| 4,902,127 A * | 2/1990 | Byer et al. | | 356/28.5 |
| 7,450,244 B2 * | 11/2008 | Xie | | 356/479 |
| 2003/0215791 A1 * | 11/2003 | Garini et al. | | 435/5 |
| 2009/0005691 A1 * | 1/2009 | Huang et al. | | 600/476 |

OTHER PUBLICATIONS

Hee et al., Polarization-sensitive low-coherence reflectometer for birefringence characterization and ranging, Jun. 1992, J.Opt. Soc. Am. B, vol. 9, No. 6, 904.*
Lee, K.S. et al,; Extending Focus Range High Resolution Endoscopic Optical Coherence Tomography; Dissertation, University of Central Florida (2008).

* cited by examiner

*Primary Examiner* — Tarifur Chowdhury
*Assistant Examiner* — Sunghee Y Gray
(74) *Attorney, Agent, or Firm* — William Greener; Bond, Schoeneck & King, PLLC

(57) ABSTRACT

A free-space Michelson Interferometer-based Dual Detection Frequency Domain-Optical Coherency Tomography (DD-FD-OCT) apparatus includes a non-polarizing beam splitter that can be used to misalign sample and reference beam paths to provide a stable π/2 phase shift between simultaneously detected interfering sample and reference beams to eliminate the mirror image created by Fourier transformation during image reconstruction. A hybrid fiber system Mach Zehnder Interferometer- and free-space Michelson Interferometer-based Dual Detection Frequency Domain-Doppler Optical Coherency Tomography (DD-FD-DOCT) apparatus provides higher power efficiency and thus better sensitivity compared to the free-space DD-FD-OCT. Both DD-FD-OCT systems enable functional imaging with the contrasts of Doppler and that of polarization, in addition to full range images simultaneously.

18 Claims, 13 Drawing Sheets

OPTICAL COHERENCE TOMOGRAPHY (OCT) APPARATUS, METHODS, AND APPLICATIONS

CROSS-REFERENCE TO RELATED APPLICATIONS

This application claims priority to U.S. provisional Patent Application Ser. Nos. 61/294,903 filed on Jan. 14, 2010, the subject matter of which is incorporated herein by reference in its entirety.

GOVERNMENT SPONSORSHIP

N/A

BACKGROUND OF THE INVENTION

1. Field of the Invention

Embodiments of the invention are generally in the field of Optical Coherence Tomography (OCT) and, more particularly pertain to Frequency Domain-Optical Coherence Tomography (FD-OCT) apparatus, methods, and applications thereof and, even more particularly to Frequency Domain-Doppler Optical Coherence Tomography (FD-DOCT) and Polarization-Sensitive Optical Coherence Tomography (PS-OCT) apparatus, methods, and applications.

2. Technical Background

Optical coherence tomography (OCT) is an imaging modality that can provide in vivo, noninvasive, high-resolution cross-sectional images of biological tissues. OCT imaging contrast relies on the variation of the strength of back-reflected light from a sample arising from refractive index fluctuation inside a biological sample. OCT can be used for structural mapping and, in a Doppler mode, to measure flow location, velocity, direction and profile.

Structural Mapping in the Frequency Domain

For structural mapping applications, while imaging can be done in both time domain and frequency domain, frequency domain OCT (FD-OCT) can achieve higher sensitivities. One of the main problems in FD-OCT, however, is the obscuring object structure caused by the mirror image generated by the Fourier transform in the image reconstruction process. A similar problem of the removal of twin images in holography has been investigated using hardware methods as well as numerical methods.

The removal of the minor image in FD-OCT is necessary to secure sufficient imaging depth especially in high axial resolution FD-OCT with a broadband source where it is difficult to achieve a fully resolved spectrum at the deeper points in space. Removal of the mirror image has been recognized as necessary to increase the imaging range required for long depth-of-focus optics in the sample arm of an FD-OCT system.

FD-OCT systems using phase shifting or frequency shifting methods have been developed to remove the minor image. Phase shifting has different implementations; it may be accomplished either by displacing the reference minor using a piezo translator or by exploiting the inherent phase shifts of 3×3 fiber-optic couplers. Both implementations directly or indirectly derive the real and imaginary components of the complex signal, which are always $\pi/2$ out of phase with each other. The phase shifting implementation using a piezo translator in the reference arm, however, requires two sequential measurements for a single full range FD-OCT image, which decreases imaging speed and is sensitive to any interferometer drifts between the $\pi/2$ phase shifted acquisitions. The implementation using the inherent phase shifts of 3×3 fiber-optic couplers enabled the instantaneous retrieval of the complex interferometric signal. The two signals were simultaneously obtained respectively in the two detectors. However the uneven wavelength-dependent splitting ratios in the 3×3 fiber coupler lead to imperfect performance. Also it can be employed only in fiber based OCT.

The frequency shifting method of removing the minor image uses an acousto-optic or an electrooptic phase modulator in the swept source based FD-OCT or a sequential modulation of the phase offset of the reference beam (M-scan) during lateral scanning of the probing beam (B-scan), which is referred to as the B-M mode scanning method. Although the two frequency shifting implementations require only one measurement to make a full range FD-OCT image, any phase error in the sequential phase modulation in the B-M method, which can be generated by movements of the subject, may limit the performance of the full range OCT. The implementation using an acousto- or electro-optic modulator in the reference arm can be applied only to the swept source based FD-OCT.

Flow-Mapping Doppler OCT in the Spectral Domain

Among the many functional OCT systems, Doppler OCT (DOCT) is one of the most useful. It is capable of the in-vivo monitoring of flow activity in biological samples such as blood flow in the human retina and the cardiovascular system of animal embryos. DOCT provides information about flow location, velocity, direction, and profile that cannot be obtained by intensity mapping alone.

Recent development in DOCT is mostly based on phase sensitive detection. This technique relies on the accuracy and stability of the measured phase difference between points at the same depth and lateral position in two consecutive axial scans. Without phase unwrapping, the maximum detectable velocity is governed by the time interval between the two scans. Recently, a time domain DOCT (TD-DOCT) with a speed of 30 frames per second, a velocity sensitivity of 17 μm/s, and a non-aliasing range of 3.9 mm/s was reported.

The Doppler technique was also extended to spectral domain OCT (SD-OCT), which not only has speed and sensitivity advantages over TD-OCT but also allows direct access to the phase information immediately following the Fourier transform. The maximum detectable velocity was also improved through the shortening of the acquisition time between two consecutive axial scans. A spectral domain Doppler OCT (SD-DOCT) utilizing a continuous readout CCD camera and achieving an acquisition speed of 29.3 kHz line rate has been reported. Further Improvement of imaging speed as well as the maximum detectable velocity in SD-DOCT by using a high speed CMOS camera as a detector resulted in a reported acquisition speed as high as 200 kHz, which was capable of 4D imaging of retina blood flow at about 13 volumes per second. A key challenge in conventional SD-OCT is the obscured object structure known as a minor image or ghost image arising from the Fourier transformation of the real function. Removal of the minor image in SD-OCT is desirable to achieve sufficient imaging depth particularly when employing a broadband light source where the achievement of high spectral resolution of a spectral interference signal is challenging. It is commonly known that the flow sensitivity of DOCT relies on the signal-to-noise ratio within the flow region. Removal of the minor image enables the use of the region around the zero path delay, which is the most sensitive region and, which, cannot be obtained in conventional SD-OCT, for flow imaging. Furthermore, the existence of a mirror image may obscure flow visibility in a sample such as capillary vessels where the flow diameter is relatively small, and the vessels may be completely overlapped by a stationary part of the sample.

Recently, a spectrometer-based full-range DOCT using the BM-scan method was demonstrated for imaging of the deep posterior of a human eye. The technique involves a filter process that causes a reduction in the detectable range of Doppler phase shift as compared to conventional SD-OCT. A reported different approach to full-range DOCT was based on a time-frequency analysis DOCT built on a spectrometer-based SD-OCT system. Contrary to phase sensitive detection, the Doppler phase shift information was determined from the amplitudes of Fourier transformations. The disadvantage to this method is that the full range signal is achieved by moving the reference mirror at a constant speed that causes the reduction in the detectable velocity dynamic range of the Doppler signal by half when operating in the full-range mode.

In view of the foregoing, the inventors have recognized the benefits and advantages that would be afforded by a Frequency Domain-Optical Coherency Tomography (FD-OCT) apparatus and methods that eliminate the minor image problem, provide high quality, full range OCT and DOCT images, and are capable of applications in, e.g., endoscopy, that can provide higher resolution than competing techniques and equipment, e.g., intravascular ultrasound.

SUMMARY

An embodiment of the invention is a Dual Detection-Frequency Domain-Optical Coherence Tomography (DD-FD-OCT) apparatus. The apparatus includes a swept source having a central wavelength output, $\lambda$; a swept source output splitting component that can split the swept source output into a sample beam S and a reference beam R; and a free-space-based sample beam and reference beam interfering portion that further includes a first non-polarizing beam splitter disposed at a point where the sample beam and the reference beam coincide that creates a first interfering sample and reference beam path $S_1R_1$ having respective sample and reference beam path lengths $L_{S1}$, $L_{R1}$, and a second interfering sample and reference beam path $S_2R_2$ having respective sample and reference beam path lengths $L_{S2}$, $L_{R2}$; a first detector disposed in the first interfering sample and reference beam path; and a second detector disposed in the second interfering sample and reference beam path, wherein the first non-polarizing beam splitter has at least one of an adjustable rotational axis and an adjustable displacement axis such that at least one of the rotational axis and the displacement axis have a respective value $\theta \neq 0$, $\delta \neq 0$, such that $[(L_{S2}-L_{R2})-(L_{S1}-L_{R1})]=\lambda/4$, which corresponds to $\pi/2$ phase shift between the interfering $S_1R_1$ signal at the first detector and the interfering $S_2R_2$ signal at the second detector.

A related embodiment of the invention is a method for obtaining a Dual Detection Frequency Domain-Optical Coherence Tomography (DD-FD-OCT) image of a sample. The method includes the steps of providing a swept source output having a central wavelength, $\lambda$; splitting the swept source output into a sample beam and a reference beam; providing a non-polarizing beam splitter to receive and combine the sample beam and the reference beam into a first sample beam $S_1$ having a first sample beam optical path length $L_{S1}$, a second sample beam $S_2$ having a second sample beam optical path length $L_{S2}$, a first reference beam $R_1$ having a first reference beam optical path length $L_{R1}'$, and a second reference beam $R_2$ having a second reference beam optical path length $L_{R2}$, in a sample beam path and a reference beam path, such that $S_1$ and $R_1$ comprise a first interfering beam path and $S_2$ and $R_2$ comprise a second interfering beam path; providing a first detector in the first interfering beam path and a second detector in the second interfering beam path; creating a $\pi/2$ phase shift between the interfering $S_1$ and $R_1$ beams detected by the first detector and the interfering $S_2$ and $R_2$ beams detected by the second detector, and simultaneously detecting the interference signal in the first detector and the interference signal in the second detector, wherein the two detected spectral interference signals having the $\pi/2$ phase difference therebetween represent the real and imaginary components of the complex spectral interference signal; and Fourier transforming the complex spectral interference signal to yield a full-range depth profile.

Another embodiment of the invention is a Dual Detection-Frequency Domain-Doppler Optical Coherence Tomography (DD-FD-DOCT) apparatus. The apparatus includes a swept source having a central wavelength output, $\lambda$; a non-free-space-based beam path for a sample beam S and a non-free-space-based beam path for a reference beam R; and a free-space-based sample beam and reference beam interfering portion that further includes a first non-polarizing beam splitter disposed at a point where the sample beam and the reference beam coincide that creates a first interfering sample and reference beam path $S_1R_1$ having respective sample and reference beam path lengths $L_{S1}$, $L_{R1}$, and a second interfering sample and reference beam path $S_2R_2$ having respective sample and reference beam path lengths $L_{S2}$, $L_{R2}$; a first detector disposed in the first interfering sample and reference beam path; and a second detector disposed in the second interfering sample and reference beam path, wherein the first non-polarizing beam splitter has at least one of an adjustable rotational axis and an adjustable displacement axis such that at least one of the rotational axis and the displacement axis have a respective value $\theta \neq 0$, $\delta \neq 0$, such that $[(L_{S2}-L_{R2})-(L_{S2}-L_{R1})]=\lambda/4$, which corresponds to $\pi/2$ phase shift between the interfering $S_1$ and $R_1$ at the first detector and the interfering $S_2$ and $R_2$ at the second detector.

A related embodiment of the invention is a method for obtaining a Dual Detection Frequency Domain-Doppler Optical Coherence Tomography (DD-FD-DOCT) image of a sample. The method includes the steps of providing a swept source output having a central wavelength, $\lambda$; splitting the swept source output with a fiber coupler and propagating the split output via a non-free-space-based waveguide into a sample beam and a reference beam; coupling the sample beam and the reference beam into a free-space-based interfering portion; superimposing the sample beam and the reference beam with a non-polarizing beam splitter into a first sample beam $S_1$ having a first sample beam optical path length $L_{S1}$, a second sample beam $S_2$ having a second sample beam optical path length $L_{S2}$, a first reference beam $R_1$ having a first reference beam optical path length $L_{R1}$, and a second reference beam $R_2$ having a second reference beam optical path length $L_{R2}$, in a sample beam path and a reference beam path such that $S_1$ and $R_1$ comprise a first interfering beam path and $S_2$ and $R_2$ comprise a second interfering beam path; providing a first detector in the first interfering beam path and a second detector in the second interfering beam path; creating $\pi/2$ phase shift in the interfering $S_1$ and $R_1$ beams detected by the first detector and the interfering $S_2$ and $R_2$ beams detected by the second detector, and simultaneously detecting the interference signal in the first detector and the interference signal in the second detector, wherein the two detected spectral interference signals having the $\pi/2$ phase difference therebetween represent the real and imaginary components of the complex spectral interference signal; Fourier transforming the complex spectral interference signal to yield a full-range depth profile; and calculating a Doppler phase shift from the phase difference between two consecutive full-range depth profiles acquired at the same location of the sample beam.

Another embodiment of the invention is a full-range Polarization-Sensitive-Optical Coherence Tomography (PS-OCT) apparatus. The apparatus includes a swept source having a central wavelength output, λ; a swept source output splitting component that can split the swept source output into a sample beam S and a reference beam R; and a free-space-based sample beam and reference beam interfering portion that further includes a first non-polarizing beam splitter disposed at a point where the sample beam and the reference beam coincide that creates a first interfering sample and reference beam path $S_1R_1$ and a second interfering sample and reference beam path $S_2R_2$; a first polarizing beam splitter disposed in the first interfering sample and reference beam path $S_1R_1$ such that a first P-polarized interference signal is generated and a first S-polarized interference signal is generated; a first detector disposed to detect the first P-polarized interference signal; a second detector disposed to detect the first S-polarized interference signal; a second polarizing beam splitter disposed in the second interfering sample and reference beam path $S_2R_2$ such that a second P-polarized interference signal is generated and a second S-polarized interference signal is generated; a third detector disposed to detect the second P-polarized interference signal; and a fourth detector disposed to detect the second S-polarized interference signal, wherein the first non-polarizing beam splitter has an adjustable rotational axis and an adjustable displacement axis such that at least one of the rotational axis and the displacement axis have a respective value $\theta \neq 0$, $\delta \neq 0$, such that there is a $\pi/2$ phase difference between the first P-polarized interference signal at the first detector and the second P-polarized interference signal at the third detector, and there is a $\pi/2$ phase difference between the first S-polarized interference signal at the second detector and the second S-polarized interference signal at the fourth detector.

A person skilled in the art will appreciate that both the DD-FD-OCT and DD-FD-DOCT embodiments referred to above as well as the PS-OCT are similar in many regards to conventional FD-OCT systems; however, the embodied inventions provide additional components and methodologies to create a stable and robust $\pi/2$ phase difference between the interfering sample/reference signal detected at one detector and the interfering sample/reference signal detected at the other detector in the dual detection embodiments, and a stable and robust $\pi/2$ phase difference between the first P-polarized interference signal at the first detector and the second P-polarized interference signal at the third detector, and the $\pi/2$ phase difference between the first S-polarized interference signal at the second detector and the second S-polarized interference signal at the fourth detector in the four detector (PS-OCT) detection embodiment.

According to a non-limiting aspect, a Fourier-Domain Mode-Locked (FDML) laser is used as the swept source, however any suitable swept source known in the art may be used.

According to various non-limiting aspects, the central wavelength of the swept source output is disclosed as ~1300 nanometers (nm), ~1 micron (μm), or ~800 nm, however, the embodied invention is not limited to these wavelengths but may operate in any wavelength regime known to be suitable for FD-OCT.

Additional features and advantages of the invention will be set forth in the following detailed description and will be readily apparent to those skilled in the art from that description and/or recognized by practicing the invention as described in following detailed description, the drawings, and the appended claims.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

FIG. 2(b) shows π/2 phase difference between the two interfering signals according to an illustrative aspect of the invention; FIG. 2(c) shows an A-scan depth profile of the single reflector in the sample obtained by a conventional FD-OCT; and, FIG. 2(d) shows an A-scan with single detection suppression of the complex conjugate peak of 35 dB in the DD-FD-OCT according to an illustrative aspect of the invention;

DETAILED DESCRIPTION OF EMBODIMENTS OF THE INVENTION

Non-limiting, exemplary embodiments of the invention are described below along with examples as illustrated in the accompanying drawings. Wherever possible, the same reference numbers will be used throughout the drawings to refer to the same or like parts.

Figure 1:
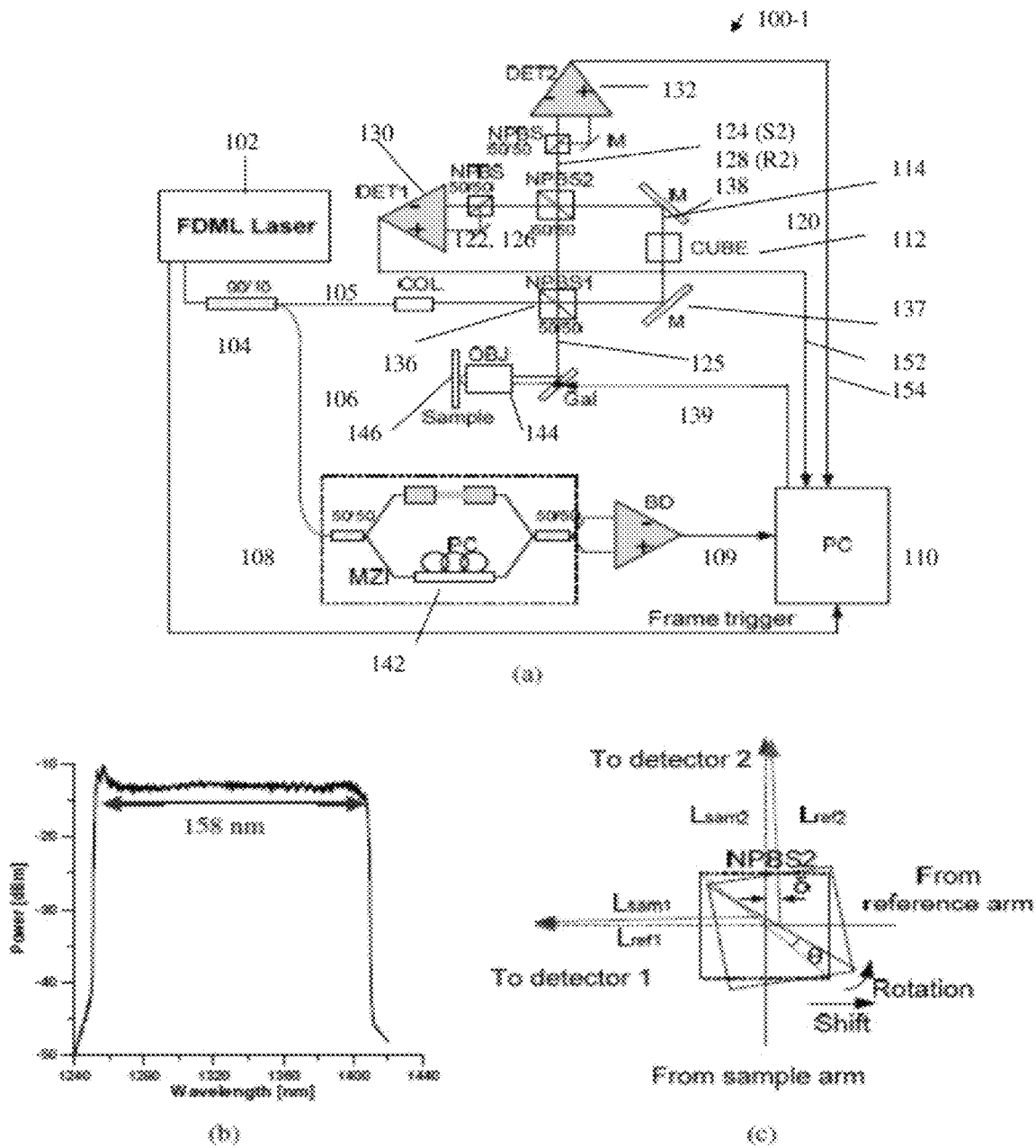
FIG. 1(a) schematically shows a layout of a DD-FD-OCT according to an illustrative embodiment of the invention.
FIG. 1(b) is a graph showing the bandwidth of the FDML laser according to an illustrative aspect of the invention.
FIG. 1(c) is a schematic illustration of the adjustments of a component of the DD-FD-OCT of FIG. 1(a) according to an illustrative aspect of the invention.

An exemplary embodiment of the invention will be referred to as a Dual Detection-Frequency Domain-Optical Coherence Tomography (DD-FD-OCT) apparatus. A schematic diagram of a non-limiting, exemplary DD-FD-OCT apparatus 100-1 is shown in FIG. 1(a). The DD-FD-OCT 100-1 has modified detection aspects and reference arms of a Michelson interferometer-based swept source FD-OCT system as will be described in detail below.

The components of the DD-FD-OCT 100-1 include a swept source 102 having a central wavelength output, λ; a swept source output splitting component 104 that provides an interference signal light output 105 and a calibration signal light output 106; a signal calibration component 108 (Mach-Zehnder interferometer 142) optically coupled to the calibration signal light output 106; a signal processing component 110 coupled to an output 109 of the signal calibration component; a dispersion compensation component 112 disposed in a reference arm optical path 114; an interference signal component 120 coupled to the interference signal light output 105 that includes first (122) and second (124) free-space-based reference arm optical paths $L_{R1}$, $L_{R2}$, 122, 124, first (126) and second (128) free-space-based sample arm 125 optical paths, $L_{S1}$, $L_{S2}$, 126, 128, a first detector DET1 130, a second detector DET2 132, a first non-polarizing beam splitter cube NPBS2 134, a second non-polarizing beam splitter cube NPB S1 136, beam steering mirrors M 137, 138, galvanometer Gal 139, objective lens OBJ 144, sample 146; and, frame trigger 148 connecting source 102 to signal processing component 110.

As mentioned above, a person skilled in the art will be familiar with swept source light sources that are suitable for FD-OCT. The broad band swept source 102 used in our experimental set-up is a Fourier-Domain Mode-Locked (FDML) laser that we designed to achieve a high-speed and wide-bandwidth. It employs a single semiconductor optical amplifier (SOA) centered at λ~1300 nm. The fiber Fabry-Perot tunable filter (FFP-TF) in the FDML has a free spectral range of ~158 nm, a BW of ~0.2 nm, and a loss (L) of <2 dB. The FFP-TF has a first-order electromechanical resonance near 45 kHz. Therefore the total fiber cavity length including the fiber delay loop (Corning SMA28-e) was designed for a length of ~4500 m. The SOA has a peak gain of 32.9 dB at 1304 nm, a BW of ~46 nm, and a 3 dB saturation power of ~12.4 dBm. The average output power of the split source beam was 5.6 mW.

FIG. 1(b) shows the power spectrum of the exemplary FDML laser 102 measured with an optical spectrum analyzer in 50 spectra average mode. The FWHM was measured to be ~158 nm (from 1252.0-1410.0 nm) corresponding to ~7 μm axial resolution in air. The light from the reference arm was guided by two minors 137, 138 to the first non-polarizing beam splitter (NPBS2) cube 134 and then split into the first detector DET1 130 and the second detector DET2 132. The sample beam 125 was also split by the first non-polarizing beam splitter NPBS2 into the two detectors 130, 132. Each reference beam 122, 124 interfered with its associated sample beam 126, 128, respectively. A bulk cube 112 in the reference arm was used to compensate for the dispersion mismatch between the two arms. The two interferometric signals 152, 154 were acquired on each channel of a two-channel, high-speed, 12-bit-resolution analog-to-digital (A/D) converter (in processing unit 110) operating at 200 Msamples/s (National Instrument, Inc., model NI PCI 5124). The Mach-Zehnder Interferometer signal 109 used for the calibration in the system was recorded on another 8 bit resolution A/D converter operating at 250 Msamples/s (National Instrument, Inc., model NI PCI 5114). The three channels 109, 152, 154 were synchronized with the external periodic triggering signal 148 generated by the swept source 102. A π/2 phase shifted interference signal was obtained by precisely rotating and shifting the first non-polarizing beam splitter cube NPBS2 as shown in FIG. 1(c). There is no difference between the sample ($L_{sam}$) and reference ($L_{ref}$) beam path lengths generated by the NPBS2 when the beam splitter is parallel to the two optical axes. However, the path lengths are mismatched by the amounts of $L_{sam1}-L_{ref1}$ for first detector 130 and $L_{sam2}-L_{ref2}$ for second detector 132 if the NPBS2 is shifted and rotated as shown in FIG. 1(c). The rotation θ and shift δ were adjusted to make the difference $(L_{sam2}-L_{ref2})-(L_{sam1}-L_{ref1})$ between the two interference signals equal to λ/4 at 1300 nm, which corresponds to a π2 phase shift for the central wavelength. This method of creating the π2 phase was stable and robust. The maximum phase shift deviation across the spectrum was calculated to be 0.1 rad, which corresponded to ±6% deviation from π/2.

Figure 2:
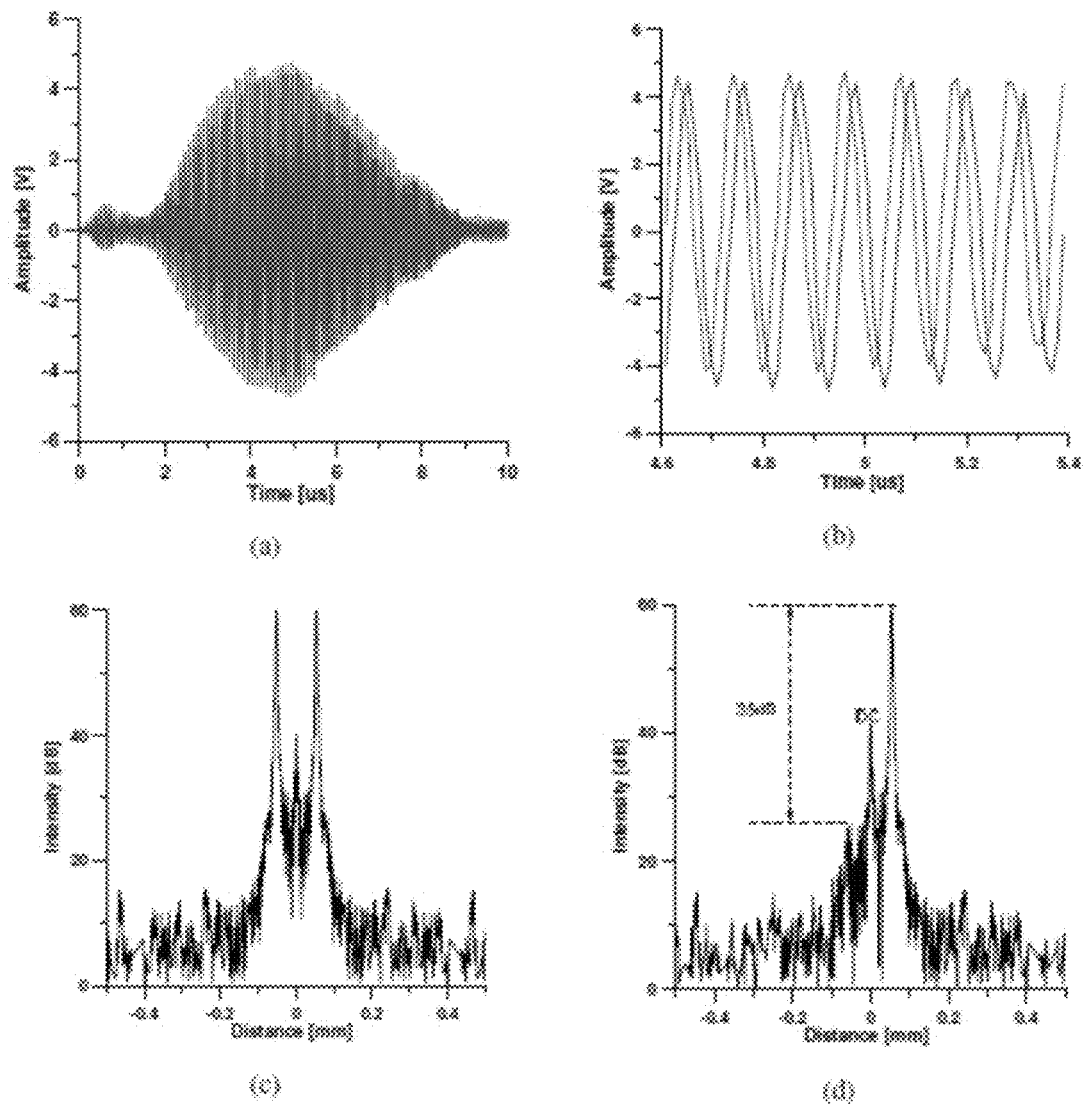
FIG. 2. (a) graphically shows two interference signals generated from the DD-FD-OCT of FIG. 1(a)

To investigate the removal of the complex conjugate artifacts from the image with the DD-FD-OCT, we used a minor (single interface) as a sample 146. The two interference signals each recorded on a separate detector are shown in FIG. 2(a). One of the two signals shown in the solid curve (red online) has a π/2 phase difference compared to the interference signal shown in the dotted curve (blue online) A complex spectral signal I'(ω) was then generated using the two acquired signals I(ω) and $$I(\omega, \Delta\phi=\pi/2) \text{ as } I'(\omega)=I(\omega)+I(\omega, \Delta\phi=\pi/2). \tag{1}$$

I'(ω) was then inverse Fourier transformed and was plotted in FIG. 2(d) together with other different delays. The suppression of the complex conjugate peak of 35 dB was obtained in the embodied DD-FD-OCT apparatus compared to the complex conjugate peak obtained from the FD-OCT using one of the dual detections.

Figure 3:
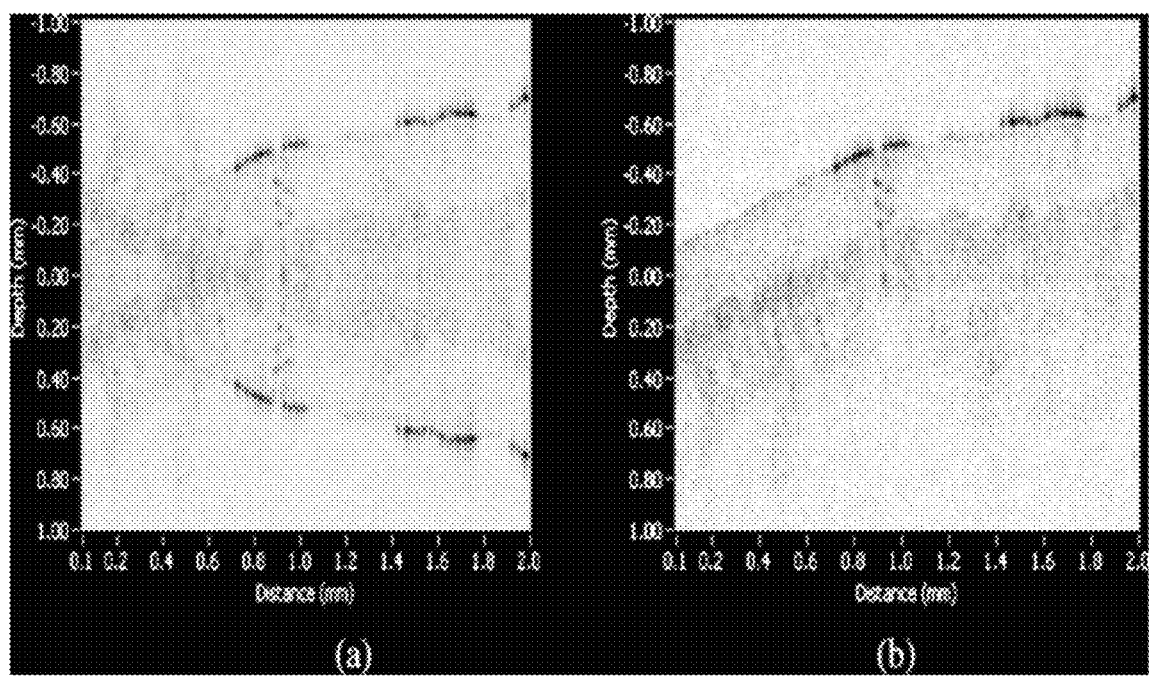
FIGS. 3(a, b) show in-vivo FD-OCT images of a human finger using a conventional FD-OCT system and with the minor image removed as taken by the DD-FD-OCT according to an illustrative aspect of the invention, respectively.

Finally, the DD-FD-OCT was applied to imaging an in-vivo human finger, and we obtained a full range OCT image as shown in FIG. 3 that consisted of 500 A-scans and 500 points per A-scan. A lateral resolution of 22 μm was achieved using a 0.02 NA objective lens. The incident power on the sample was 2.3 mW. The average of all the collected spectra in the B-scan was subtracted from each unprocessed spectrum to remove coherent noise in the image. In FIG. 3(a) the image using only a single detector shows the folded artifact image, while the artifact-free image generated in the embodied DD-FD-OCT system is shown in FIG. 3(b). Both images are 2 mm×2 mm.

We have thus experimentally demonstrated that the DD-FD-OCT apparatus enables full range imaging by the instantaneous retrieval of quadrature components of the complex interferometric signal. Using the setup, we achieved a complex conjugate artifact suppression of 35 dB. The DD-FD-OCT may also be less sensitive to the phase error generated by involuntary movements of a subject compared to other established full range OCT systems because it uses two signals with a phase difference of π/2 obtained simultaneously from two detection arms to remove mirror images at all imaging depths.

Another embodiment of the invention is a Dual Detection Frequency Domain Doppler OCT imaging apparatus and method referred to herein as DD-FD-DOCT that can achieve full range imaging without the need for any other processing to remove phase ambiguities.

The Doppler effect was discovered by the Austrian physicist Christian Johann Doppler in the mid 1800s. Doppler imaging techniques have been developed in the field of ultrasound imaging. Analogous to ultrasonography, optical coherence tomography (OCT) is a non-invasive imaging technology that is capable of depth sectioning of biological tissue, yet at the micrometer scale resolution. Traditionally, OCT imaging contrast relies on the variation of the strength of back-reflected light from a sample that arises from refractive index fluctuation inside a biological sample. In addition to structural mapping, many functional OCT systems have been actively developed in order to gain additional information that will lead to a better understanding of sample properties. Among the many functional OCT systems, Doppler OCT (DOCT) is one of the most useful. It is capable of in-vivo monitoring of flow activity in biological samples such as blood flow in the human retina and the cardiovascular system of embryos. DOCT provides information about flow location, velocity, direction, and profile that cannot be obtained by intensity mapping alone.

Recent development in DOCT is mostly based on phase sensitive detection, so-called phase-resolved DOCT. The early development of phase-resolved DOCT was based on phase sensitive time domain OCT (TD-OCT) that required mechanical scanning of the reference arm and hence limited the maximum acquisition speed to a few kHz regime. Later, the phase-resolved Doppler technique was also extended to frequency domain OCT (FD-OCT), which not only has speed and sensitivity advantages over TD-OCT but also allows direct access to the phase information immediately following the Fourier transform. A spectrometer based frequency domain Doppler OCT (FD-DOCT) utilizing a continuous readout CCD camera and achieving an acquisition speed of 29.3 kHz line rate has been reported. Moreover, the further increase of imaging speed and the maximum detectable velocity in spectrometer based FD-DOCT, using a high-speed CMOS camera as a detector, was also investigated. However, the increase in maximum detectable velocity accommodated from high-speed acquisition comes with the cost of an increase in the minimum detectable velocity since both of them depend on the acquisition rate. With a camera line rate of 200 kHz, the minimum detectable axial velocities as measured with and without lateral scanning were 800 μm/s and 8.2 mm/s, respectively. Nevertheless, the high speed imaging capability of FD-DOCT is attractive for real time in-vivo monitoring of flow activity in biological samples as well as for flow segmentation in 3D that provides accurate information of flow angle.

One of the main challenges in conventional FD-OCT is the obscured object structure known as a minor image or ghost image that arises from the Fourier transformation of a real function. Since the demand of high axial-resolution requires the employment of an extremely broadband light source, achieving high axial-resolution at high acquisition speed requires sacrificing spectral resolution that eventually leads to a reduction in the imaging depth range. Therefore, the removal of the minor image in high resolution FD-OCT is desirable to double the imaging depth range. In addition, it is evident that the performances of phase-resolved DOCT, such as Doppler phase stability and accuracy, highly rely on the signal-to-noise ratio (SNR) of the system. Therefore, the ability to employ a maximum SNR out of a given phase-resolved DOCT system is desirable. Unlike conventional FD-OCT, full-range FD-OCT allows the use of the region around the zero-delay position, which is the most sensitive region in FD-OCT. Therefore, the combination of Doppler detection and full-range OCT has the promise of improving both structural and Doppler images.

Most full-range FD-OCT techniques reported to date share the basic principle of reconstructing a complex spectral interference signal from measurable real signals. The complex spectral interference can be expressed as $F'(k)=A(k)\exp\{i\Psi(k)\}$, where $k=2\pi/\lambda$ is the wave number, and $A(k)$ and $\Psi(k)$ are real functions representing the magnitude and phase of the complex spectral interference $F'(k)$, respectively. The early attempts of full-range FD-OCT were based on sequential phase shifting methods, where multiple spectra with a certain phase relation were sequentially acquired and used to reconstruct the complex signal directly, such as the known five-step, three-step, and two-step phase shifting methods. The first two techniques directly determined the phase term $\Psi(k)$ of the spectral interference signal from a set of 3 to 5 acquired spectral interference signals. On the other hand, the third method measured the real and imaginary components of the complex spectral interference, (i.e. $F'(k)=F(k)+iF(k, \Delta\Psi=\pi/2)$). In all cases, the sequential acquisition of multiple spectra for each axial line lead to a reduction in the frame acquisition speed. Furthermore, the approach is vulnerable to sample movement that occurs during the acquisition of those axial scans used to construct the complex signal. To overcome this limitation, several simultaneous detection schemes, such as the 3×3 coupler, polarization-based demodulation, and the inventors' dual-detection techniques were proposed. A different approach for retrieving the complex interference signal was based on Hilbert-transform methods such as the carrier frequency modulation and BM-scan methods. The Hilbert-transform based methods require no extra acquisition to reconstruct each frame of the full-range image and hence maintain the full acquisition speed of the FD-OCT. Moreover, the acquisition of BM-scan method was further improved by simply offsetting the sampling beam spot away from the pivot point of the scanning mirror to introduce the modulation frequency without additional hardware modification. The proposed modulation technique simplifies the acquisition of BM-scan method. Nevertheless in order to obtain depth profiles, the methods require extra processing steps such as forward and backward Fourier transformations as well as bandpass filtering to reconstruct complex spectral interference signals prior to normal Fourier transformation.

The combination of full-range FD-OCT and phase-resolved Doppler imaging is challenging because in most cases, both full-range and Doppler capabilities rely on the phase relation between consecutive axial lines. A Hilbert-transform based full-range DOCT using the BM-scan method was demonstrated for imaging of the deep posterior of a human eye. The technique introduced phase modulation during lateral scanning to produce a frequency shift after Fourier transform and then applied band-pass filtering to remove negative frequency components. However, certain amounts of axial movement cause additional frequency shifts in the transformed domain and could lead to unintentional signal loss after band-pass filtering. Therefore, the presence of high axial motion of the sample could affect minor suppression performance and lead to a reduction in the detectable velocity range of Doppler imaging as compared to what can be achieved by the same system operated in conventional FD-OCT. Recently, a modified BM-scan method based on a parabolic phase modulation technique was proposed to minimize the effect of sample motion and improve the velocity dynamic range. However, an increase in Doppler phase noise was observed.

A different approach to full-range DOCT was based on a time-frequency analysis technique built on a spectrometer-based FD-OCT system called joint spectral and time domain OCT. Contrary to phase sensitive detection, the Doppler phase shift information was determined from the amplitudes of Fourier transformations. The Doppler image determined by the proposed technique was demonstrated to be less sensitive with respect to SNR and more accurate at close to maximum detectable velocity limit than that determined by phase-resolved techniques. Nevertheless, the full range signal was achieved by introducing change in the optical path length in the reference arm at a constant speed that caused a reduction in the detectable velocity dynamic range of the Doppler signal by half when operating in the full-range mode. Moreover, the method employed a large number of axial scans, for example 16-40 A-scans, and involved 2D Fourier transformation to determine a single line of velocity map that lead to an increase in both acquisition and processing time compared to phase resolved FD-DOCT.

Simultaneous phase shifting is promising for Doppler imaging, nevertheless no experimental confirmation has been reported to date. The DD-FD-OCT embodiment disclosed above involves the simultaneous detection of the quadrature components of the complex spectral interference. Therefore, the full range signal is obtained without a loss in acquisition speed compared with the conventional FD-OCT. In addition, since the complex interference signal is constructed from two interference signals with a stable π/2 phase difference simultaneously detected by two independent detectors, any changes in optical path difference during acquisition equally affect the phase change in both detected signals without affecting the π/2 phase relation between them. Therefore, the minor suppression performance of DD-FD-OCT is insensitive to sample motion, including large sample movements. One of the advantages of DD-FD-OCT to Doppler imaging is that the full-range signal can be achieved without manipulation of the phase relation between consecutive axial lines. Therefore, the phase information of the full-range signal will be almost identical to that acquired by the conventional FD-OCT method. Hence the full-range DD-FD-OCT is fully applicable to phase-resolved Doppler detection without reduction in detectable velocity dynamic range. In addition, phase-resolved DOCT can utilize the maximum SNR provided by the full-range capability (i.e. the 10 dB sensitivity fall-off range is doubled, and the most sensitive region around the zero path delay can be used).

The embodiments disclosed below implement DD-FD-OCT for phase-resolved Doppler imaging. Since the performance of phase-resolved DOCT highly depends on the SNR of the system, we disclose a non-limiting, exemplary DD-FD-DOCT built on a combination of a fiber-based and free-space setup in a Mach-Zehnder interferometer configuration. The fiber portion also adds flexibility to the system enabling integration with handheld or endoscopic devices, while the free-space portion provides a stable π/2 phase relation between the two detected spectral interference signals.

In principle, the embodied dual detection technique is applicable to both spectrometer-based FD-OCT and swept-source-based FD-OCT. However, considering cost effectiveness, the swept-source system yields an attractive path since the cost of two photoreceivers is considerably lower than that of two spectrometers.

Figure 4:
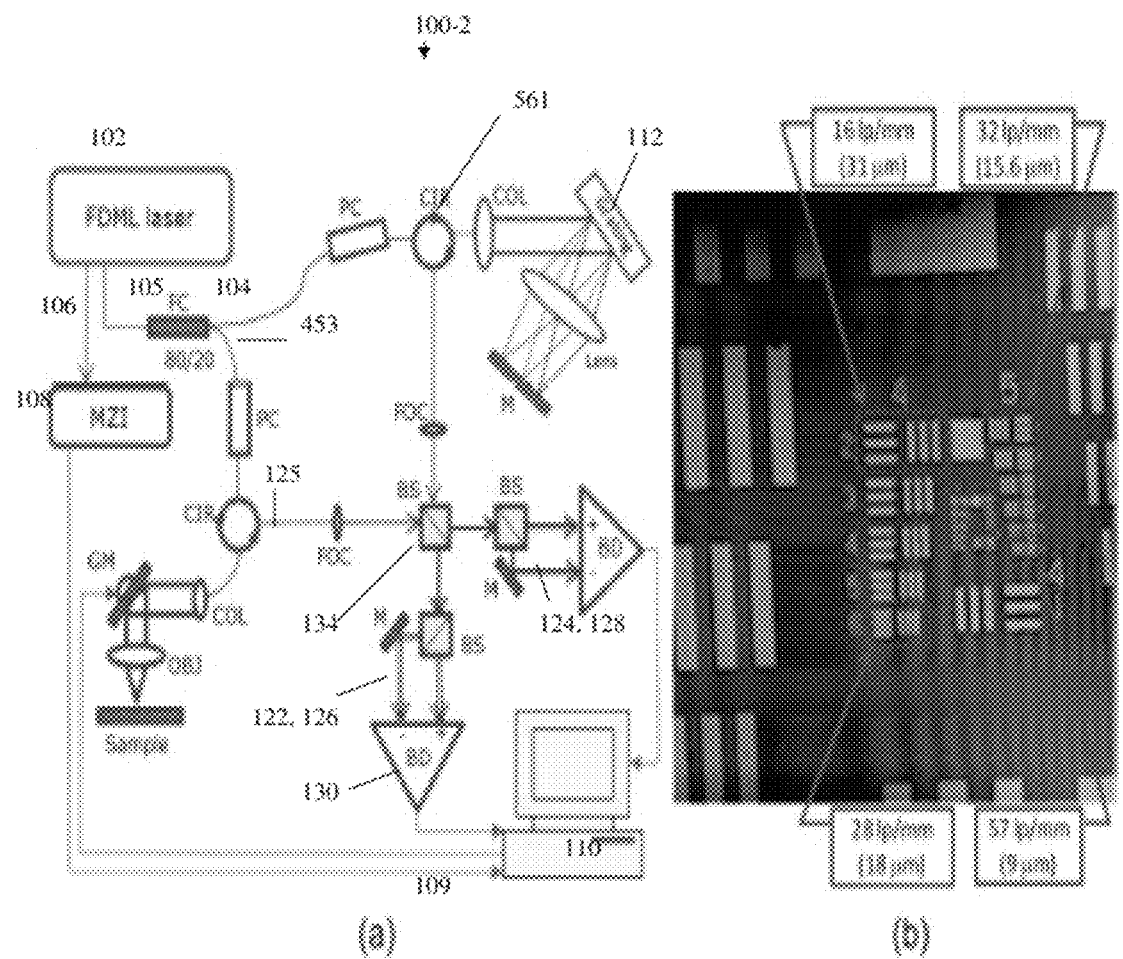
FIG. 4(a) schematically shows a layout of a DD-FD-DOCT according to an illustrative embodiment of the invention.
FIG. 4(b) shows en face image acquired over about a 4 mm×4 mm field of view of a calibrated resolution target, where the number of line-pairs per millimeter (lp/mm) and the corresponding lateral resolution in parenthesis of several groups of the target are provided in the red boxes.

A non-limiting, exemplary embodiment of a DD-FD-DOCT apparatus 100-2 is illustrated in FIG. 4a. The components of the DD-FD-DOCT apparatus 100-2 include a swept source 102 having a central wavelength output, λ, including a calibration signal light output 106 and a detection light output 105 that is input to a fiber-based swept source output splitting component 104 for providing a reference arm optical signal 451 and a sample arm optical signal 453; a MZI signal calibration component 108 optically coupled to the calibration signal light output 106; a signal processing component 110 coupled to an output 109 of the signal calibration component; a dispersion compensation component 112 optically coupled to a reference arm optical path 114 via an optical circulator 561; a sample arm optical path 125 for providing a sample arm output signal. The reference arm optical path is identical to that of the DD-FD-OCT apparatus embodiment described above and comprises a first free-space interference signal optical path 122/126 having a first path length, $L_{INT1}$, and a second free-space interference signal optical path 124/128 having a second path length, $L_{INT2}$, that have a free-space interference optical signal path difference $|L_{INT1}-L_{INT2}|\sim\lambda/4$. A beam splitter 134 is disposed so as to receive and interfere the reference arm optical signal and the sample arm optical signal. A first detector 130 is disposed in the first free-space interference signal optical path and a second detector 132 is disposed in the second free-space interference signal optical path.

Similar to the DD-FD-OCT embodiment described above, the swept source 102 is a Fourier domain mode locking (FDML) frequency swept laser (Microns Optics) operating at 1320 nm center wavelength with a sweeping range of ~158 nm The source sweep rate was ~44.6 kHz with 5.6 mW average output power. The output from the light source was coupled into a fiber system and then split by a 20/80, 1×2 fiber coupler 104. A 20% portion of the power was delivered to the reference arm, in which a Fourier domain optical delay line was implemented in order to compensate for the overall dispersion. Another portion of the beam was delivered to the sample arm 125, which further includes a collimator COL, a galvanometer beam steering minor GM (VM500, GSI Lumonics), and a 20 mm effective focal length spherical lens OBJ. The lateral resolution was quantified through en face imaging of a 1951 USAF resolution target (Edmund Optics) as shown in FIG. 4(b). A lateral resolution of less than 15 μm was observed. Both sample and reference beams were then coupled back to the fiber system, delivered through fiber circulators and out-coupled through adjustable focusers to the free space Michelson interferometer-based portion of the apparatus, as shown in FIG. 4a.

In the free-space section, the two beams were superimposed and split at and by the beam splitter 142 with a 50/50 split ratio. The interference signals in both paths were detected by two independent 80 MHz balanced photoreceivers (model 1817, New Focus). A π/2 precise and stable phase relation between the two detected signals was achieved through a slight difference in the alignment of the two detection paths in the free space system so that the two optical path length differences were different by the amount of about a quarter of the center wavelength of the light source 102. The two detected interference signals were then digitized on each channel of a two-channel, high-speed, 12-bit-resolution analog-to-digital converter operating at 200 Msamples/s (NI PCI 5124, National Instrument). The detected spectra were calibrated to be linear in frequency-space prior to taking a fast Fourier transform (FFT) using the time-frequency relation generated from the position of peaks, valleys, and zero-crossing of an interference signal measured by an additional MZI recorded on another 8-bit-resolution analog-to-digital converter operating at 250 Msamples/s (NI PCI 5114, National Instrument). The spectral interference signals and the MZI calibration signal were measured simultaneously, and the calibration process was done in software.

Figure 5:
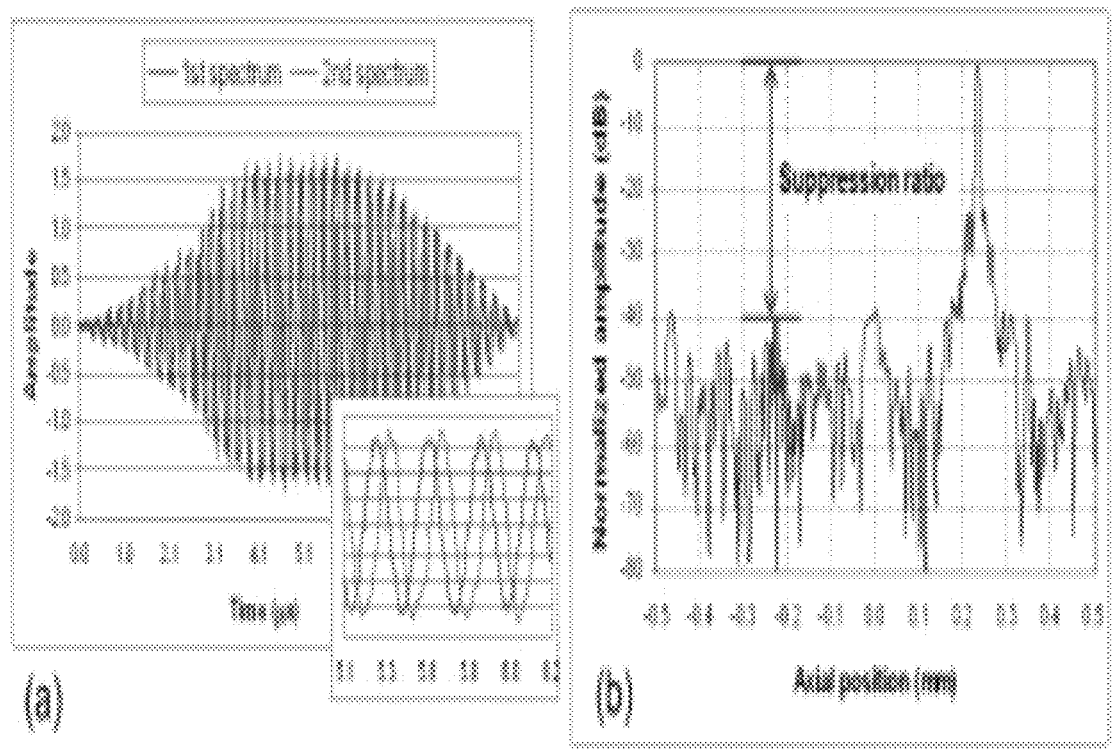
FIG. 5(a) shows two typical spectra with quadratic phase relation simultaneously acquired by the dual detection system when imaging a single reflector.
FIG. 5(b) shows a depth profile that demonstrates the suppression performance of the DD-FD-DOCT that corresponds to a case of matching amplitudes (unlike that shown in FIG. 5(a)) of the signals shown in (a) within 2%, according to an illustrative aspect of the invention.

The example of two acquired spectra with quadratic phase relation, when using a single reflector as a sample, is illustrated in FIG. 5(a). The two spectra are almost the same except for a π/2 phase difference between them. The suppression ratio, which is the ratio between the amplitudes of a signal peak and its mirror counterpart, of about 40 dB [FIG. 5(b)] was observed over a long period of operation. It is noted that in order to get maximum suppression performance, the magnitude of the two spectra should be about equal to within a 2% maximum difference. In the reported experiment, the 40 dB suppression shown in FIG. 5(b) was achieved by monitoring the plot similar to that in FIG. 5(b), while adjusting the alignment in the free-space portion. Once the maximum suppression was achieved, the magnitudes of the two signals were also well matched, unlike that shown in FIG. 5(a). Considering the setup in FIG. 4(a), since the two spectra were acquired simultaneously, any movement that occurred in either the reference or the sample arms or both prior to the free-space section equally contributed to the frequency shift in both acquired spectra, and, therefore, did not affect the π/2 phase relation between them. Furthermore, the full-range signal was achieved without manipulating the phase relation between consecutive axial scans. This capability allowed the ease of implementation of the DD-FD-DOCT in phase-resolved Doppler imaging with equivalent velocity dynamic range to the conventional FD-DOCT.

Doppler Imaging Method

Phase-resolved DOCT relies on the accuracy and stability of the detection of the phase difference between points at the same depth and same lateral position of two consecutive axial scans. Knowing the phase difference, the flow velocity was estimated as $$V(z)=(\lambda_0 \Delta\phi(z))/4\pi T n \cos\theta, \quad (2)$$

where z denotes the axial position, $\lambda_0$ is the central wavelength of the source, T is a time interval between the two points used to calculate the phase difference $\Delta\phi(z)$, n is the average sample refractive index, and θ is the angle of the flow direction relative to the propagation axis of the illumination beam. In practice, the calculation of the phase difference $\Delta\phi$ involves the inverse tangential function, and hence exhibits a π phase ambiguity. Moreover, the presence of phase noise imposes a challenge in phase unwrapping of the OCT signal, and could lead to misinterpretation. Therefore, without phase unwrapping, the detectable phase shift of π is maximum, and the maximum detectable axial velocity (corresponding to θ=zero) is given by $$V_{a,max}(z)=\lambda_0/4Tn. \quad (3)$$

In our system, the FDML laser was capable of 44.6 kHz sweep rate providing up to 89,200 spectra per second. At the maximum sweep rate of the source, the time interval between two consecutive spectra was 11.2 μs, corresponding to a maximum detectable axial velocity of ~22 mm/s However, to avoid complexity in data processing and accommodate for real time processing and display, the backward sweep signals were omitted and only forward sweep signals were used in the Doppler phase shift calculation. Therefore, the time interval between two consecutive forward spectra was 22.4 μs, corresponding to a theoretical maximum detectable axial velocity of about 11 mm/s Furthermore, we designed a block acquisition scheme for swept-source-based FD-DOCT, where a group of axial profiles used to calculate the Doppler phase shift was acquired at exactly the same lateral position. The technique minimized the effect of lateral scanning to the Doppler phase error. Specifically, the number of sampling points was set so that multiple spectra consisting of both forward and backward sweep signals were recorded at each lateral position of the sample beam. The block of acquired signal was chopped into M sub-sections containing one forward spectrum per section. Each chopped signal contained 2000 sampled points. After calibration to a linear frequency domain by using the calibration curve, the number of sampling points per spectrum was approximately 1000 points. In order to increase the sampling resolution in the depth profile, a FFT was performed with zero padding to 2048 points. Using the algorithm reported in Y. Zhao, Z. Chen, C. Saxer, Q. Shen, S. Xiang, J. F. de Boer, and J. S. Nelson, "Doppler standard deviation imaging for clinical monitoring of in vivo human skin blood flow," Opt. Lett. 25(18), 1358-1360 (2000), the phase shift was then calculated using $$\Delta\varphi(z) = \tan^{-1}\left[\frac{\sum_{m=1}^{M-1} \text{Im}\{I_m^*(z) \cdot I_{m+1}(z)\}}{\sum_{m=1}^{M-1} \text{Re}\{I_m^*(z) \cdot I_{m+1}(z)\}}\right], \quad (4)$$

where z represents an axial position, $I_m(z)$ is a complex signal achieved from inverse Fourier transform of the $m^{th}$ detected spectral interference, and $I^*_m(z)$ denotes a complex conjugate signal of $I_m(z)$. Using this formalism, the measured phase shift was averaged over the measurements. Therefore, increasing M improves the quality of the detected Doppler phase shift at the cost of a reduction in imaging speed.

Two scanning protocols were used in our experiments; namely, B-mode and M-mode Doppler imaging. In B-mode Doppler imaging, the step-wise function of voltage was applied to the galvo-mirror. At each position of the galvo-mirror, a block of data containing M forward spectra were acquired, and then the galvo-mirror was moved to the next position and another set of spectra was acquired. The process was repeated until the desired amount of lateral pixels per image was achieved. A sampling interval of 10 μm was used throughout (i.e. 200 lateral pixels correspond to a 2 mm physical dimension). The B-mode Doppler was useful for locating the flow.

In M-mode Doppler imaging, the lateral beam position was fixed at a desired lateral position corresponding to the center of the flow location first determined by the B-mode operation. A constant voltage was applied to the galvo-mirror. Without moving the sample beam, a block of data containing M forward spectra was acquired. The acquisition was repeated until the desired amount of lateral pixels per image was achieved. The lateral dimension of the M-mode Doppler image provided information about flow characteristics over time. In M-mode acquisition, the time interval between two consecutive lateral pixels was approximately 2 ms. Therefore, an M-mode Doppler image consisting of 200 lateral pixels represents a depth-resolved flow profile over a 400 ms time window. The M-mode Doppler was used in flow measurement verification presented below.

Flow Phantom and Pumping System

Figure 6:
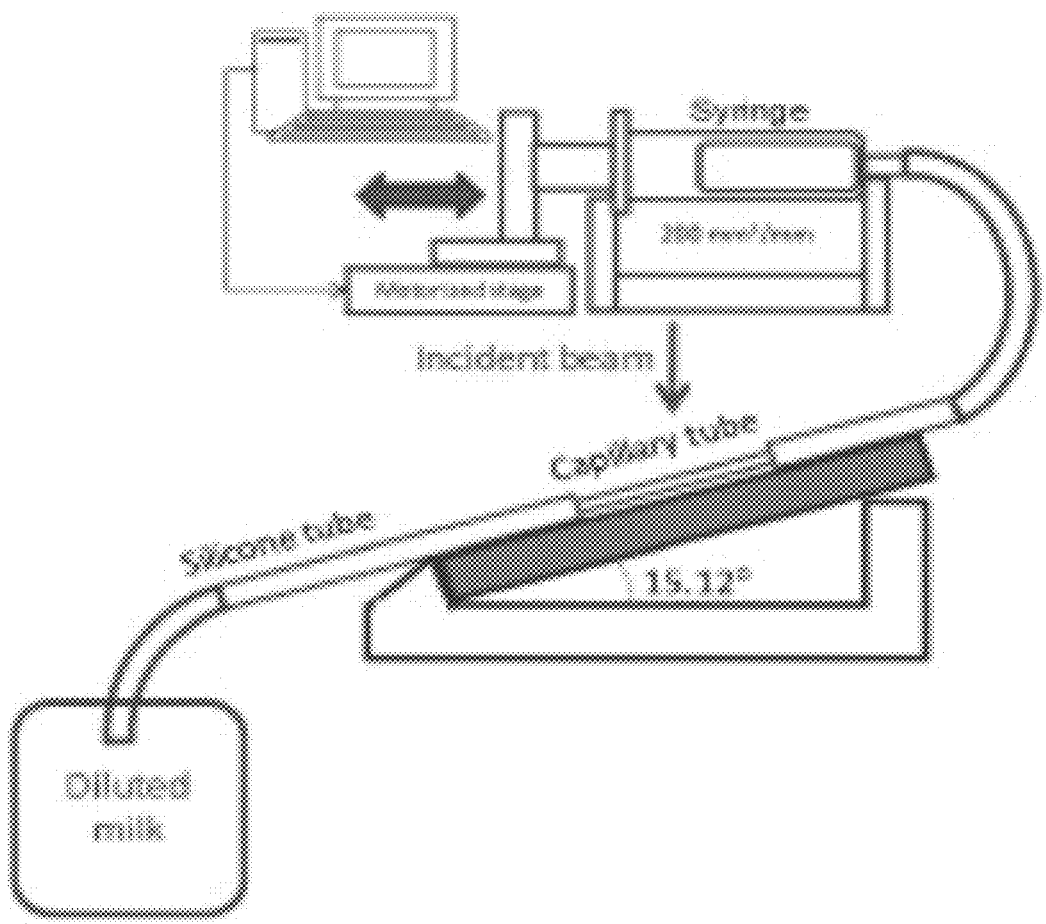
FIG. 6 schematically shows a flow phantom and pumping system according to an illustrative aspect of the invention.

A flow phantom is illustrated in FIG. 6. The flow speed was set by a computer controlled motorized translation stage (DCX-PCI 100 Controller, Precision MicroControl Corp.) with a resolution of ~17 nm per one revolution of the motor head. A syringe ejected 200 mm$^3$ of contained fluid for every 1 mm translation of the stage. Therefore, knowing the translation speed of the motorized stage, the corresponding total flow rate of the system was determined. By assuming a laminar flow profile, the peak flow velocity (vm) was estimated through the relation $v_m$=2F/(Flow area), where F is the flow rate of the system. A capillary tube was tilted at a fixed angle of 15.12° with respect to the horizontal level as shown in FIG. 6. This produced the angle between the incident beam and the flow direction of 74.88° at the outer surface of the tube, and hence 78.86° at the flow sample after accounting for refraction in the medium (n=~1.35) when the illumination beam was perfectly aligned to the vertical direction. This flow angle was chosen to accommodate for the translation range and the maximum speed of the motorized stage so that the flow speed of up to the maximum detectable limit could be observed.

Phase Stability of the System

The minimum detectable velocity was determined by the phase stability of the system that could be quantified from the temporal fluctuation of the Doppler phase shift ($\Delta\phi_{err}$) while imaging a static structure that ideally should yield zero speed. In practice, there was a small deviation of the phase difference even without the presence of moving scatterers. This served as a theoretical limit in velocity sensitivity for each particular DOCT system. Sequentially, the minimum detectable axial velocity was determined by $$V_{a,min} = \lambda_0 \Delta\phi_{err} / 4\pi Tn. \quad (5)$$

We quantified the minimum detectable axial velocity in two scenarios: with lateral scanning (B-mode Doppler) and without lateral scanning (M-mode Doppler). Under each imaging scenario, the stability of the Doppler phase shift was monitored over time when using a fixed mirror as a sample. In this measurement, the SNR was set to be sufficiently high (i.e. >60 dB) so that the Doppler phase error was solely dominated by the phase stability of the system as set by, for example, the swept source, the interferometer, the scanning mechanics, and the signal processing. In this experiment, the SNR was defined by 20 log [(S−$\mu_{noise}$/$\sigma_{noise}$], where S was the signal peak amplitude at the position of the mirror surface averaged across the full lateral dimension of the acquired Doppler image and $\mu_{noise}$ and $\sigma_{noise}$ were the mean and standard deviation of the noise floor measured within the region around the signal peak while the sample beam was blocked, respectively. The measured phase stability under this condition therefore represented the characteristics and performance of the DOCT system. The Doppler phase error was quantified as follows. For each acquisition frame of the Doppler image, the phase shift was averaged over a certain depth range (5 pixels) around the signal peak corresponding with the position of the minor surface, and then averaged across the full lateral dimension (200 pixels or equivalently 200 positions of the sample beam scanning). The measurement was repeated for 500 frames in both cases. In the literature, two methods of $\Delta\phi_{err}$ quantification were used by calculating a standard deviation (σ) and/or a full width at half maximum (FWHM) of the histogram distribution of the measured Doppler phase shift. Since the two methods yield results that differ by a significant order of magnitude, we calculated and compared both the standard deviation and the FWHM of the histogram of the phase shift errors. Moreover, the Doppler phase stabilities at different values of M in Eq. (4) were investigated.

Figure 7:
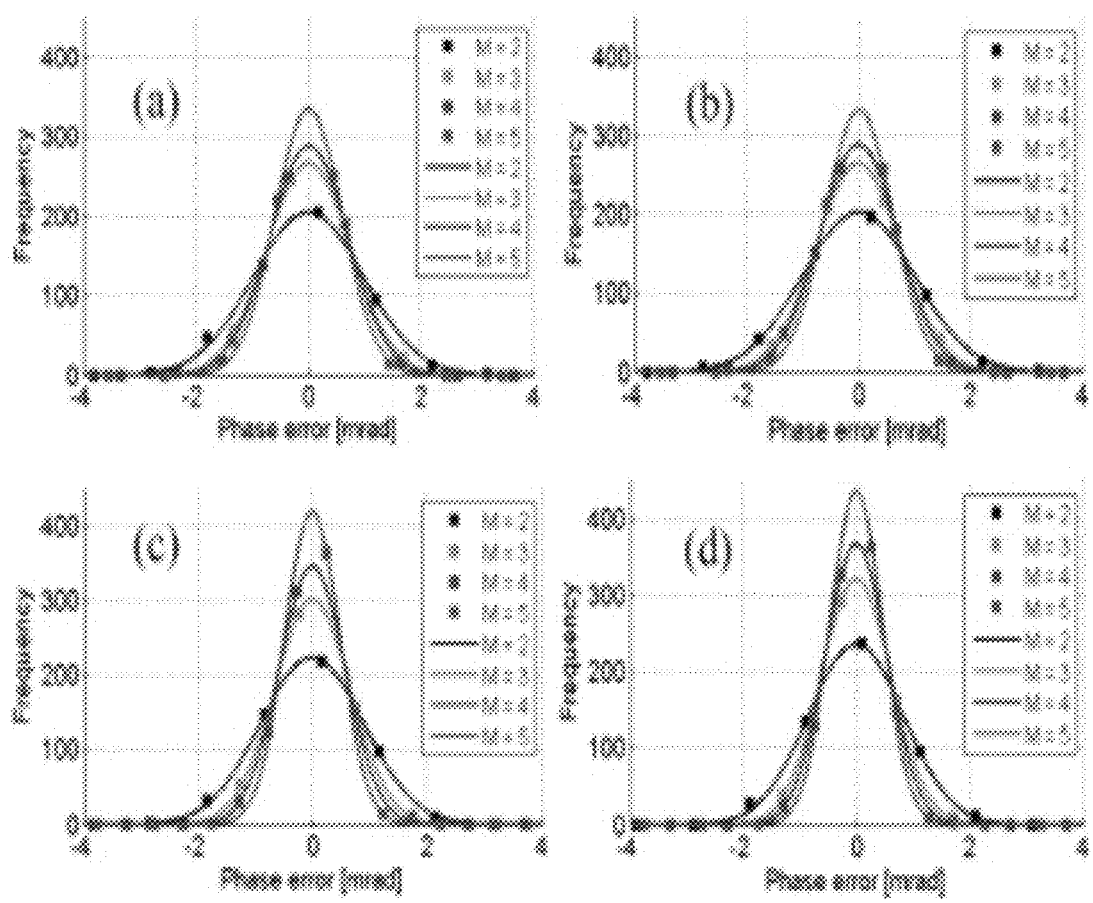
FIG. 7 shows histogram distributions of measured Doppler phase errors where (a,c) and right (b,d) are corresponding with the measurement data taken with conventional FD-OCT and DD-FD-DOCT, and (a,b) and (c,d) are corresponding with B-mode and M-mode operations, respectively.

The histogram plots of the measured Doppler phase errors are shown in FIG. 7. The left (a,c) and right (b,d) figures are histograms of phase shift errors when operating in a conventional FD-DOCT and full-range Doppler imaging using DD-FD-OCT, respectively. To investigate the effect of lateral scanning to the Doppler phase stability, the measurements were performed in both B-mode (a,b) and M-mode (c,d) Doppler imaging. In addition, the minimum detectable axial velocity was calculated by using Eq. (5) as shown in Table 1.

TABLE 1

(The minimum detectable axial velocity at various M values, where the top (without parenthesis) and bottom (in parenthesis) values in each cell corresponded to B-mode and M-mode Doppler imaging, respectively)

| M | 2 | | 3 | | 4 | | 5 | |
|---|---|---|---|---|---|---|---|---|
| | σ | FWHM | σ | FWHM | σ | FWHM | σ | FWHM |
| Conventional FD-OCT | | | | | | | | |
| $\Delta\phi_{err}$(mrad) | 1.04 | 2.29 | 0.76 | 1.75 | 0.69 | 1.63 | 0.61 | 1.41 |
| | (0.88) | (2.11) | (0.66) | (1.56) | (0.59) | (1.36) | (0.48) | (1.13) |
| $V_{a,min}$(μm/s) | 3.62 | 7.98 | 2.65 | 6.10 | 2.40 | 5.68 | 2.13 | 4.91 |
| | (3.07) | (7.35) | (2.30) | (5.44) | (2.06) | (4.74) | (1.67) | (3.94) |
| Full-range DD-FD-OCT | | | | | | | | |
| $\Delta\phi_{err}$(mrad) | 0.97 | 2.33 | 0.75 | 1.78 | 0.69 | 1.63 | 0.61 | 1.40 |
| | (0.88) | (1.98) | (0.63) | (1.46) | (0.55) | (1.28) | (0.47) | (1.09) |

TABLE 1-continued (The minimum detectable axial velocity at various M values, where the top
(without parenthesis) and bottom (in parenthesis) values in each cell corresponded
to B-mode and M-mode Doppler imaging, respectively)

| M | 2 | | 3 | | 4 | | 5 | |
|---|---|---|---|---|---|---|---|---|
| | σ | FWHM | σ | FWHM | σ | FWHM | σ | FWHM |
| $V_{a,min}$(μm/s) | 3.38 (3.07) | 8.12 (6.90) | 2.61 (2.20) | 6.13 (5.09) | 2.40 (1.92) | 5.68 (4.46) | 2.13 (1.64) | 4.88 (3.80) |

The results show that the implemented DOCT system exhibits high Doppler phase stability (i.e., the FWHM Doppler phase error between two consecutive axial lines was less than 3 milliradians (mrad) in all cases). Furthermore, the results quantify the improvement in the Doppler phase stability and hence the minimum detectable velocity as a function of M, which was the number of spectra used to calculate the Doppler phase shift. In addition, the phase error was slightly increased when operating in B-mode Doppler compared with the M-mode Doppler, demonstrating the effect of scanning mechanics to the system phase stability. In general, one may expect a significant difference in phase errors between M-mode and B-mode operations. In this experiment, the phase errors were only slightly different since the acquisition scheme was designed in the way that all spectra used to determine Doppler phase shift were acquired at the same lateral position and hence the effect of transverse motion was suppressed. In contrast to the B-mode in our experiment, where we acquired two spectra from the same lateral position, in other phase-resolved DOCT techniques where instead raster scanning is used, the phase estimation is subject to severe degradation in stability unless the ratio between the sample beam width and the lateral sampling interval is sufficiently high. Indeed, in raster scanning, the transverse motion of the sample beam during the acquisition period will introduce an additional phase noise in phase-resolved DOCT. The block acquisition scheme utilized in this paper does not required oversampling to achieve high phase stability, nevertheless it may be subject to limitation in frame acquisition rate due to the mechanical response of the scanning device and the data readout rate of the detector. Depending on different applications, this trade-off between frame rate and Doppler phase stability should be taken into account when designing a phase-resolved DOCT system.

Moreover, it can be observed from Table 1 that the phase stability in the conventional FD-OCT and DD-FD-OCT were almost the same verifying that the phase stability was not affected by the full-range operation in DD-FD-OCT. It should be pointed out that both full-range and conventional results were calculated from the same set of acquired spectra with and without full-range enabled, respectively. Finally, the phase stability quantified by the two methods, the standard deviation and FWHM, were different by a factor of about two. Therefore, the quantification of Doppler sensitivity by using the standard deviation may have led to an overestimation. The FWHM method should be considered to represent the minimum detectable velocity. The FWHM can be approximated by $2(2 \ln 2)^{1/2} \sigma$ or $2.3548\sigma$ if the measurement data exhibits a Gaussian distribution.

Phase Stability in the Presence of Noise

Figure 8:
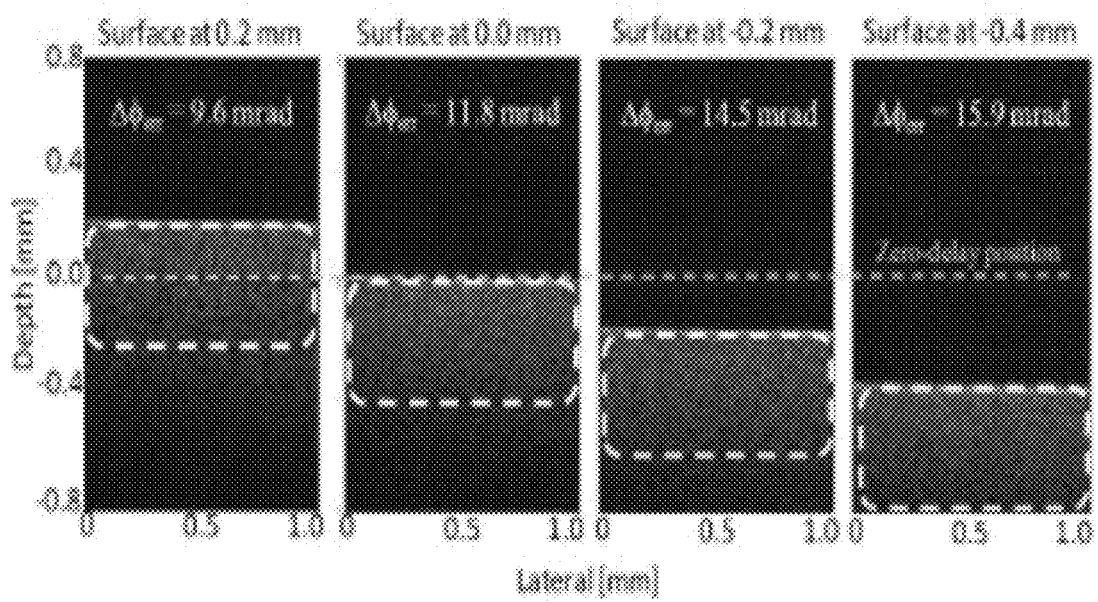
FIG. 8 illustrates average phase errors measured from stationary diluted milk when the sample surface was placed at different depth positions by changing the optical path length in the reference path, where the white dash box indicates the area that the phase error was averaged over in each case, and the orange dash line denotes the zero-delay position, according to an illustrative aspect of the invention.

In the previous experiment, the phase stabilities were measured based on high SNR condition where the noise effect was negligible. Therefore, the phase error was dominated by the system phase error. Under this circumstance, both conventional FD-OCT and full-range DD-FD-OCT exhibited the same phase stability performance. However in the presence of noise, as encountered when imaging biological samples, the phase stability degraded as a function of SNR. In this experiment, the Doppler phase stability was measured in B-mode Doppler imaging by using stationary diluted milk as a sample. To demonstrate the effect of SNR fall-off to Doppler phase stability of the system, average Doppler phase errors were measured at different locations of the sample relative to the zero-delay position as shown in FIG. 8. The position of the sample relative to the zero-delay position was adjusted by changing the optical path length in the reference arm without any modification of the sample arm. The phase error in each case was averaged over the region of interest (ROI) marked by the white dash box in FIG. 8 with 250 pixels axially and 100 pixels laterally.

Figure 9:
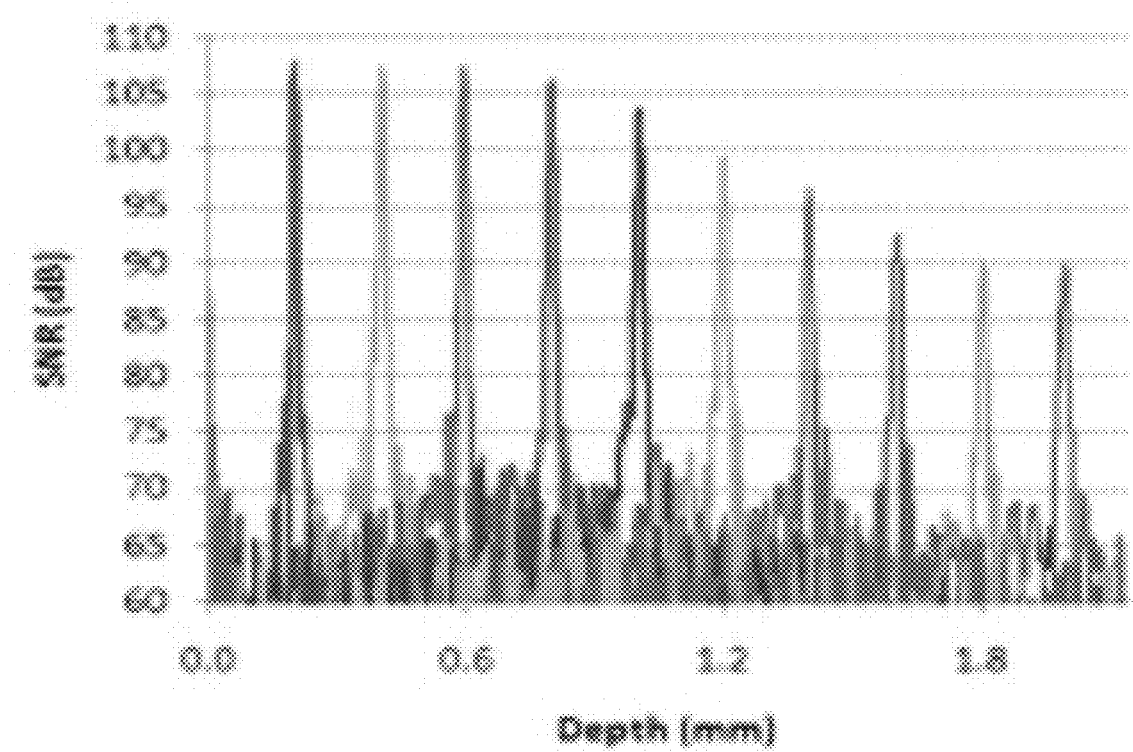
FIG. 9 graphically shows measured SNR (in air) of the DD-FD-DOCT system as a function of depth, according to an illustrative aspect of the invention.

The average SNR measured within the ROI was about 20 dB as calculated over the ROI by using the same formula as disclosed above, where S was the average signal amplitude over the ROI and $\mu_{noise}$ and $\sigma_{noise}$ were the mean and standard deviation of the noise floor measured within the ROI while the sample beam was blocked, respectively. In each scenario, the Doppler phase shift was measured with M equal 5, and the standard deviation σ was calculated from 200 measurements. The phase error was then determined as 2.36σ, assuming a Gaussian distribution. The first scenario, where the zero-delay position was placed below the sample surface that is only available with full-range imaging, provided best phase stability since the SNR was maximum at the zero-delay position in FD-OCT. The phase error at around the zero-delay position measured at averaged SNR of 20 dB was approximately 10 mrad corresponding to a minimum detectable velocity of about 34 μm/s. This is about a five times degradation from the case of static mirror measurement. The phase stability degraded as the sample surface was placed further away from the zero-delay position due to the effect of sensitivity fall-off as a function of depth as shown in FIG. 9. The SNR was measured in air by using a mirror as a sample similar to that previously detailed above. One can observe that the SNR quickly drops at depth beyond 0.6 mm The 10 dB SNR fall-off distance was at around 1.4 mm in air corresponding to about 1 mm in tissue.

Flow Measurement Verification

Figure 10:
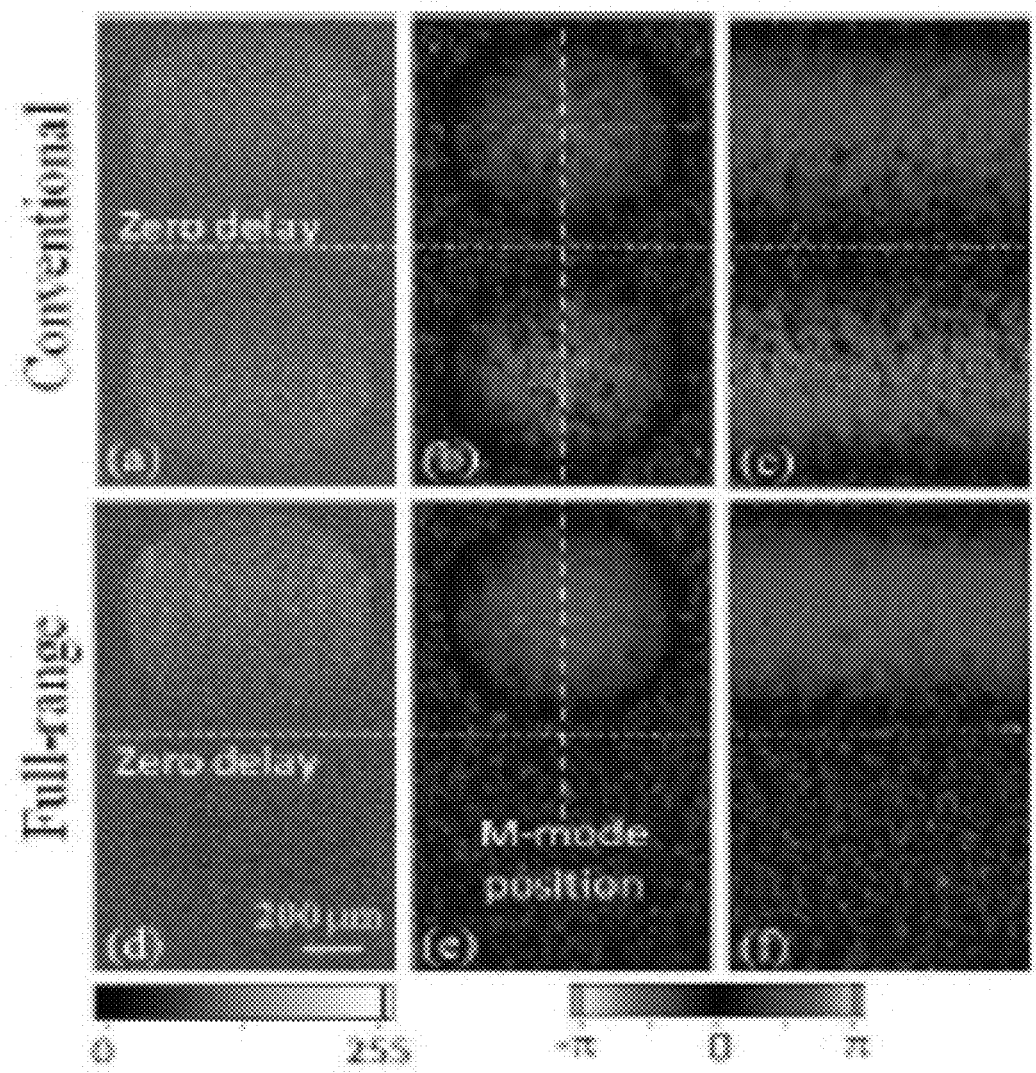
FIGS. 10 (a) and (d) are intensity images, (b) and (e) are B-mode Doppler images, and (c) and (f) are M-mode Doppler images measured by the conventional FD-OCT and the DD-FD-DOCT, respectively, where yellow horizontal dash lines indicate the zero path delay position, a white vertical dash line indicates the lateral position where the M-mode Doppler was operated, and a white solid line at the bottom right of (d) denotes a scale bar that is applied for all images (a-f)

To validate the flow velocity detection capability of the full-range DD-FD-DOCT as compared with the conventional FD-OCT, we imaged a flow phantom that was diluted milk pumped through a capillary tube of ~770 μm inner diameter by using the pumping system described above. FIGS. 10(a) and 10(d) show cross-sectional intensity images of the flow phantom operated at a flow speed of about 44 mm/s acquired by the conventional FD-OCT and the DD-FD-DOCT, respectively. Results demonstrate that the minor-image removal performance of the full-range DD-FD-DOCT was not affected by the sample movement caused by the flow activity.

Corresponding with the intensity images in FIGS. 10(a) and 10(d), 2D color maps of B-mode Doppler phase shift detected by conventional FD-OCT and the full range DD-FD-DOCT are shown in FIGS. 10(b) and 10(e), respectively.

The Doppler phase shift is displayed using a color map, where the amounts of Doppler phase shift of $-\pi$, $-\pi/2$, 0, $\pi/2$, and $\pi$ were mapped to yellow, red, black, blue, and light blue, respectively. In conventional FD-OCT, because of the conjugate relation, the mirror image exhibits the same amount of Doppler phase shift, but with opposite sign, compared with its counterpart corresponding to areas appearing in red and blue colors in FIG. 10(b), respectively. The minor Doppler signal is successfully invisible in the full range DD-FD-DOCT as shown in FIG. 10(e). Furthermore, Doppler phase shifts at various set flow speeds of the flow phantom were measured. The phase shift was determined by using Eq. (4) with M equal 5. The flow angle was set at approximately 78.86 degree after accounting for the refraction of the beam. Since the incident angle was quite wide, the actual illumination power at the sample was dramatically decreased due to the strong reflection at the outer surface of the capillary tube based on Fresnel reflection. This led to the presence of random phase for the background noise over the flow cross-sectional area. To minimize this effect and achieve a smooth flow profile, a 7 points one dimensional median filter was applied to every axial line of the M-mode Doppler image. The median filter is an efficient method for removing salt-and-pepper noise while minimally altering neighboring pixels.

Figure 11:
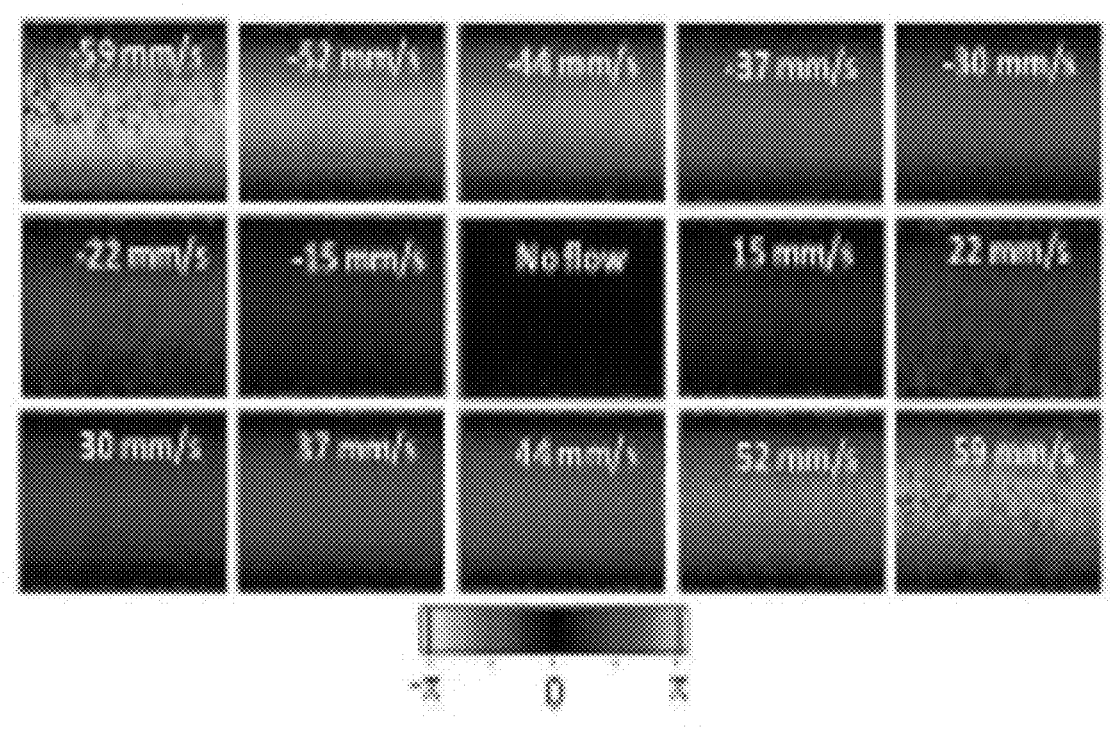
FIG. 11 shows M-mode Doppler images calculated from the full-range signal at various flow velocities set by the pump, according to an illustrative aspect of the invention.

At each set flow velocity, two Doppler images determined by conventional FD-OCT and full-range DD-FD-DOCT were calculated from the same set of acquired spectra. All Doppler images acquired with conventional FD-OCT were established from the signal from one of the two detectors since the measured SNR performances of the 1st and 2nd detection systems as well as the full-range system were almost identical given that the difference was less than 1 dB. Therefore, Doppler images obtained by both systems exhibit similar Doppler sensitivity. We decided that it is most important to compare the performances of the conventional FD-OCT and full-range DD-FD-DOCT by using the same set of data to ensure that they were measured in exactly the same conditions (i.e., same lateral position of the sample beam and same condition of the flow sample). To measure the peak flow velocity, the center of the flow area, marked as a white dash line in FIGS. 10(b) and 10(e), was determined from a B-mode Doppler image [FIG. 10(a)]. Then the lateral position was fixed at that position and an M-mode Doppler image [FIGS. 10(c) and 10(f)] was taken. Each M-mode Doppler image consisted of 800 pixels along the depth axis (vertical axis) centered at zero-delay position as indicated by yellow dash lines in FIGS. 10 and 200 pixels along the time axis (horizontal axis). The M-mode Doppler color maps corresponding with various flow velocities set by the pump from no flow to 59 mm/s was demonstrated in FIG. 11, where negative and positive velocities represent flow in opposite direction. When operating at a theoretical maximum detectable axial velocity of about 11 mm/s as justified earlier, a maximum absolute flow speed of about 57 mm/s is achievable at the flow angle of 78.86°.

Figure 12:
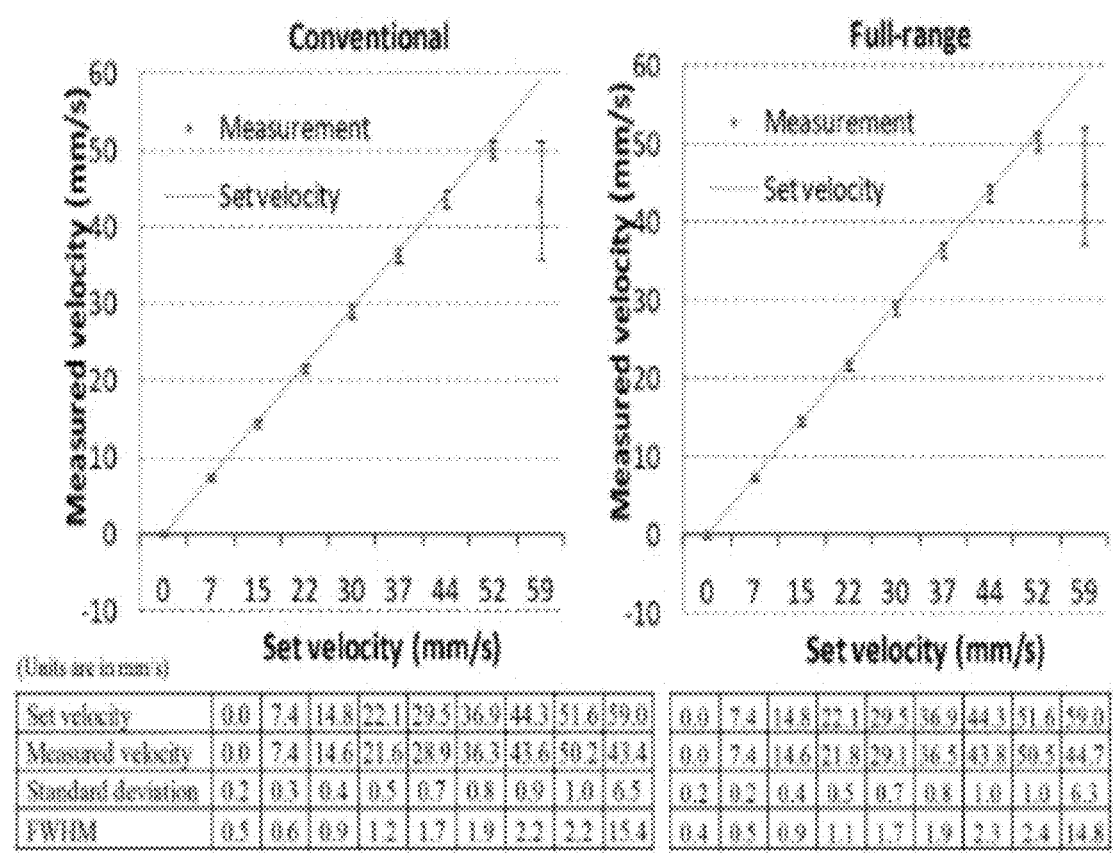
FIG. 12 shows plots between the measured velocity at the peak of the flow profile and the set flow velocity measured by the conventional FD-OCT (left) and the full-range DD-FD-DOCT (right). 200 measurements were performed at each set flow velocity. Each data point corresponds to a mean value, and the size of the error bar at each measurement point represents the FWHM of the distribution of the measured Doppler phase shift estimated by 2.36σ assuming a Gaussian distribution, according to an illustrative aspect of the invention.

Sequentially, the peak flow velocity from each acquired M-mode Doppler image was determined. The phase shift was first averaged along the time axis yielding an averaged phase-depth profile, and then averaged from 5 pixels around the peak of the profile. To minimize the effect over time of slow fluctuation of the flow speed intrinsic to the characteristic of the pump, the measurement was repeated for 200 frames of M-mode Doppler images acquired at 2 fps. This frame rate provided measurement data that included several cycles of the slow flow fluctuation over time. The mean and standard deviation were computed representing a Doppler phase shift at the peak of the flow profile for each set flow speed of the flow phantom. Finally, the measured peak velocities were calculated and compared to those estimated from the pump's parameters. The absolute flow velocities were determined by using Eq. (2). Using the system's parameters that were $\lambda_0$=1320 nm, T=22.4 μs, θ=78.86 degree, and n=~1.35, Doppler velocity corresponding to each set velocity of the pump was calculated and compared as shown in FIG. 12.

From Table 1, at M equal 5, the measured Doppler phase error was ~1 mrad, and the minimum detectable axial velocity was computed to be ~4 μm/s, corresponding to an absolute flow speed of 21 μm/s at 78.86 degree. In this measurement, the average SNR at around peak flow location was about 15 dB. When imaging such a weak backscattering sample, the presence of noise degraded the Doppler phase sensitivity to about 24 mrad (FWHM) that corresponded with the minimum detectable absolute flow velocity of about 0.45 mm/s at the flow angle of 78.86 degree in both cases of the conventional and the full-range operations as determined by 2.36σ of the measurement data at no flow (see FIG. 12). Furthermore, as the flow speed was increased, the standard deviation of the measured Doppler phase was further broadened particularly at high flow velocity from 30 to 59 mm/s This broadening was induced by flow fluctuation caused by the pump especially when traveling over a long distance of the motorized stage. This small fluctuation was intrinsic to the characteristic of the pump and hence affected both the conventional and the full-range measurements by almost the same amount as shown in FIG. 12. Nevertheless, this fluctuation tended to occur in cycles and therefore the measured flow speed was still acceptable compared to the set flow speed after averaging over a long period of time except for the last measurement at ~59 mm/s, which is beyond the maximum detectable velocity of the system as limited by the π phase ambiguity. At the set flow speed of ~59 mm/s, the fluctuation tended to occasionally cross the π phase ambiguity boundary, which corresponded to an absolute flow velocity of ~57 mm/s, hence suffered from phase wrapping and could not provide a correct measurement as can be observed in both plots in FIG. 12.

Figure 13:
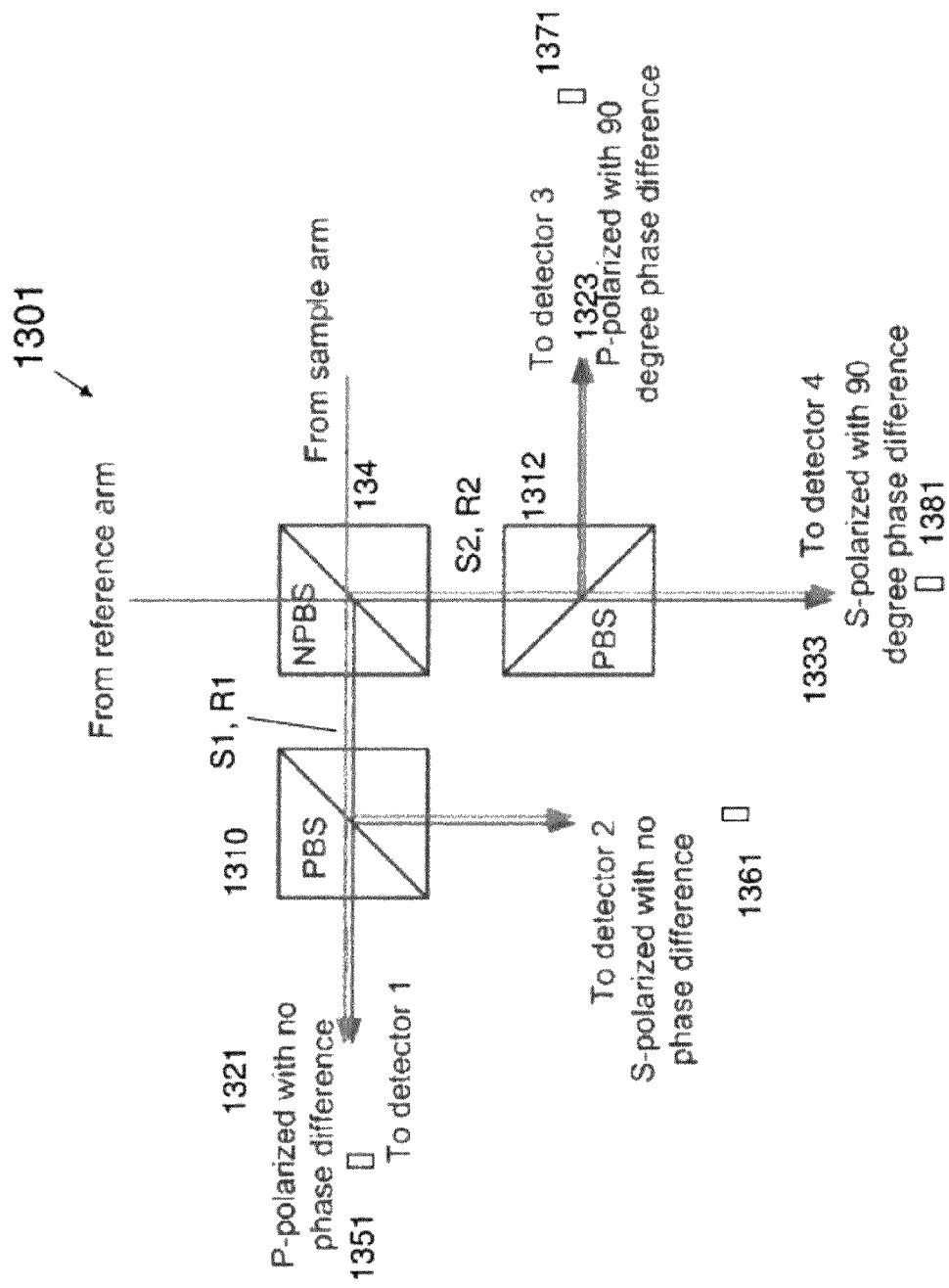
FIG. 13 schematically shows the free-space-based sample beam and reference beam interference portion for a full-range, polarization sensitive OCT apparatus, according to an exemplary embodiment of the invention.

The embodiments disclosed herein above are referred to as "Dual-Detection" because they involve two detectors used in conjunction with a non-polarizing beam splitter that provides a phase difference of π/2 between the simultaneously detected, non-polarized interference signals at the two detectors. Another embodiment, referred to herein as a polarization sensitive-OCT (PS-OCT) is identical to the Dual-Detection embodiments described above except that, referring to FIG. 13, the free-space-based sample beam and reference beam interfering portion 1301 includes, in addition to the adjustable non-polarizing beam splitter 134 used to combine and interfere the sample and reference beams, a first polarizing beam splitter 1310 disposed in the first interfering sample and reference beam path $S_1R_1$ such that a first P-polarized interference signal 1321 is generated and a first S-polarized interference signal 1331 is generated, a first detector 1351 disposed to detect the first P-polarized interference signal, a second detector 1361 disposed to detect the first S-polarized interference signal, a second polarizing beam splitter 1312 disposed in the second interfering sample and reference beam path $S_2R_2$ such that a second P-polarized interference signal 1323 is generated and a second S-polarized interference signal 1333 is generated, a third detector 1371 disposed to detect the second P-polarized interference signal, and a fourth detector 1381 disposed to detect the second S-polarized interference signal, wherein the first non-polarizing beam splitter 134 has at least one of an adjustable rotational axis and an adjustable displacement axis (as before) such that at least one of the rotational axis and the displacement axis have a respective value θ≠0, δ≠0, such that there is a π/2 phase difference between the first P-polarized interference signal 1321 at the first detector 1351 and the second P-polarized interference signal 1323 at the third detector 1371, and there is a π/2 phase difference between the first S-polarized interference signal 1331 at the second detector 1361 and the second S-polarized interference signal 1333 at the fourth detector 1381. Thus, two orthogonal polarization full range images are obtained: e.g., a P-polarized full range image can be achieved using a P-polarized interference signal with no phase difference from detector 1351 and a P-polarized interference signal with a 90 degree phase difference from detector 1371, and an S-polarized full range image can be achieved using a S-polarized interference signal with no phase difference from detector 1361 and an S-polarized interference signal with a 90 degree phase difference from detector 1381. This arrangement can be substituted for the free-space-based (Michelson interferometer-based) sample beam and reference beam interfering portion in either of the DD-FD-OCT and the DD-FD-DOCT.

All references, including publications, patent applications, and patents cited herein are hereby incorporated by reference in their entireties to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:

1. Currently amended) A Dual Detection-Frequency Domain-Optical Coherence Tomography (DD-FD-OCT) apparatus, comprising:
   a swept source having a central wavelength output, $\lambda$;
   a swept source output splitting component that can split the swept source output into a sample beam S and a reference beam R; and
   a free-space-based sample beam and reference beam interfering portion further comprising:
   a first non-polarizing beam splitter disposed at a point where the sample beam and the reference beam coincide that creates a first interfering sample and reference beam path $S_1R_1$ having respective sample and reference beam path lengths $L_{S1}$, $L_{R1}$, and a second interfering sample and reference beam path $S_2R_2$ having respective sample and reference beam path lengths $L_{S2}$, $L_{R2}$;
   a first detector disposed in the first interfering sample and reference beam path; and
   a second detector disposed in the second interfering sample and reference beam path,
   wherein the first non-polarizing beam splitter has at least one of an adjustable rotational axis and an adjustable displacement axis such that at least one of the rotational axis and the displacement axis have a respective value θ≠0, δ≠0, such that the sample and reference beam optical paths are misaligned, further such that $[(L_{S2}-L_{R2})-(L_{S1}-L_{R1})]=\lambda/4$, which corresponds to a π/2 phase shift between the interfering $S_1R_1$ signal at the first detector and the interfering $S_2R_2$ signal at the second detector.

2. A Dual Detection-Frequency Domain-Optical Coherence Tomography (DD-FD-OCT) apparatus, comprising:
   a swept source having a central wavelength output, $\lambda$;
   a swept source output splitting component that provides an interference signal light output and a calibration signal light output;
   a signal calibration component optically coupled to the calibration signal light output;
   a signal processing component coupled to an output of the signal calibration component;
   a beam splitting component disposed to receive and split the interference signal light output into a sample beam and a reference beam;
   a dispersion compensation component disposed in the reference arm optical path;
   a free-space-based sample beam and reference beam interfering portion optically coupled to the interference signal light output, including first and second free-space-based reference arm optical paths, $L_{R1}$, $L_{R2}$, first and second free-space-based sample arm optical paths, $L_{S1}$, $L_{S2}$, a first detector, and a second detector,
   wherein,
   the first detector is disposed in the first reference arm optical path and the first sample arm optical path so as to detect optical interference between the first reference arm optical path and the first sample arm optical path and,
   the second detector is disposed in the second reference arm optical path and the second sample arm optical path so as to detect optical interference between the second reference arm optical path and the second sample arm optical path,
   further wherein the signal processing component is coupled to an output from the first detector and to an output from the second detector,
   further wherein the sample and reference beam optical paths are misaligned such that the interference signals between the sample beams and the reference beams detected by the first and second detectors, respectively, have a phase difference of $[(L_{S2}-L_{R2})-(L_{S1}-L_{R1})]=\pi/2$.

3. The apparatus of claim 2, further comprising a first non-polarizing beam splitter disposed in the free-space-based sample beam and reference beam interfering portion at a point where the sample beam and the reference beam coincide, the first non-polarizing beam splitter having at least one of an adjustable rotational axis and an adjustable displacement axis such that at least one of the rotational axis and the displacement axis have a respective value $\theta \neq 0$, $\delta \neq 0$, such that $[(L_{S2}-L_{R2})-(L_{S1}-L_{R1})]=\lambda/4$, which corresponds to the $\pi/2$ phase shift.

4. The apparatus of claim 2, wherein the swept source is a Fourier-Domain Mode-Locked laser (FDML).

5. The apparatus of claim 2, wherein the central wavelength output is one of $\lambda$~1300 nanometers (nm), $\lambda$~1 micron ($\mu$m), and $\lambda$~800 nm.

6. The apparatus of claim 3, wherein the first non-polarizing beam splitter is a first non-polarizing beam splitter cube.

7. The apparatus of claim 2, wherein the signal calibration component is a Mach-Zehnder Interferometer.

8. A Dual Detection-Frequency Domain-Doppler Optical Coherence Tomography (DD-FD-DOCT) apparatus, comprising:
a swept source having a central wavelength output, $\lambda$
a non-free-space-based beam path for a sample beam S and a non-free-space-based beam path for a reference beam R; and
a free-space-based sample beam and reference beam interfering portion further comprising:
a first non-polarizing beam splitter disposed at a point where the sample beam and the reference beam coincide that creates a first interfering sample and reference beam path $S_1R_1$ having respective sample and reference beam path lengths $L_{S1}$, $L_{R1}$, and a second interfering sample and reference beam path $S_2R_2$ having respective sample and reference beam path lengths $L_{S2}$, $L_{R2}$;
a first detector disposed in the first interfering sample and reference beam path; and
a second detector disposed in the second interfering sample and reference beam path,
wherein the first non-polarizing beam splitter has at least one of an adjustable rotational axis and an adjustable displacement axis such that at least one of the rotational axis and the displacement axis have a respective value $\theta \neq 0$, $\delta \neq 0$, such that the sample and reference beam optical paths are misaligned, further such that $[(L_{S2}-L_{R2})-(L_{S1-LR1})]=\lambda/4$, which corresponds to a $\pi/2$ phase shift between the interfering $S_1$ and $R_1$ at the first detector and the interfering $S_2$ and $R_2$ at the second detector.

9. (Currrently amended) A Dual Detection-Frequency Domain-Doppler Optical Coherence Tomography (DD-FD-DOCT) apparatus, comprising:
a swept source having a central wavelength output, $\lambda$, including a calibration signal light output and an interference signal light output;
a signal calibration component optically coupled to the calibration signal light output;
a fiber-based swept source output splitting component disposed to receive and split the interference signal light output into a sample beam in a non-free-space-based sample beam path and a reference beam in a non-free-space-based reference beam path;
a signal processing component coupled to an output of the signal calibration component;

a dispersion compensation component disposed to receive the reference beam;
a first non-polarizing beam splitter disposed to receive and combine the sample beam from the non-free space-based sample beam path and the reference beam from the non-free space-based reference beam path, and further disposed to input the combined sample and reference beams into a free space-based sample beam and reference beam interference portion,
wherein the free-space-based sample beam and reference beam interference portion further includes:
first and second free-space-based reference arm optical paths, $L_{R1}$, $L_{R2}$, first and second free-space-based sample arm optical paths, $L_{S1}$, $L_{S2}$,
a first detector, and
a second detector,
wherein the first non-polarizing beam splitter has at least one of an adjustable rotational axis and an adjustable displacement axis such that at least one of the rotational axis and the displacement axis have a respective value $\theta \neq 0$, $\delta \neq 0$, such that $[(L_{S2}-L_{R2})-(L_{S1}-L_{R1})]=\lambda/4$, and
further wherein,
the first detector is disposed in the first reference arm optical path and the first sample arm optical path so as to detect optical interference between the first reference arm optical path and the first sample arm optical path and,
the second detector is disposed in the second reference arm optical path and the second sample arm optical path so as to detect optical interference between the second reference arm optical path and the second sample arm optical path,
further wherein the signal processing component is coupled to an output from the first detector and to an output from the second detector, and
further wherein the sample and reference beam optical paths are misaligned and the interference signals between the sample beams and the reference beams detected by the first and second detectors, respectively, have a phase difference of $[(L_{S2-LR2})-(L_{S1-LR1})]=\pi/2$.

10. The apparatus of claim 9, wherein the dispersion compensation component is a Fourier domain optical delay line.

11. The apparatus of claim 9, wherein the swept source is a Fourier-Domain Mode-Locked laser (FDML).

12. The apparatus of claim 9, wherein the central wavelength output is one of $\lambda$~1300 nanometers (nm), $\lambda$~1 micron ($\mu$m), and $\lambda$~800 nm.

13. The apparatus of claim 9, wherein the signal calibration component is a Mach-Zehnder Interferometer.

14. A method for obtaining a Dual Detection Frequency Domain-Optical Coherence Tomography (DD-FD-OTC) image of a sample, comprising:
providing a swept source output having a central wavelength, $\lambda$;
splitting the swept source output into a sample beam and a reference beam;
providing a non-polarizing beam splitter to receive and combine the sample beam and the reference beam into a first sample beam $S_1$ having a first sample beam optical path length $L_{S1}$, a second sample beam $S_2$ having a second sample beam optical path length $L_{S2}$, a first reference beam $R_1$ having a first reference beam optical path length $L_{R1}$, and a second reference beam $R_2$ having a second reference beam optical path length $L_{R2}$, in a sample beam path and a reference beam path, such that $S_1$ and $R_1$ comprise a first interface beam path and $S_2$ and $R_2$ comprise a second interface beam path;
providing a first detector in the first interface beam path and a second detector in the second interfering beam path;

creating a π/2 phase shift between the interfering $S_1$ and $R_1$ beams detected by the first detector and the interfering $S_2$ and $R_2$ beams detected by the second detector, and simultaneously detecting the interference signal in the first detector and the interference signal in the second detector, wherein the step of creating the π/2 phase shift comprises misaligning the sample and reference beam optical paths such that $[(L_{S2}-L_{R2})-(L_{S1}-L_{R1})]=\lambda/4$, further wherein the two detected spectral interference signals having the π/2 phase difference therebetween represent the real and imaginary components of the complex spectral interference signal; and Fourier transforming the complex spectral interference signal to yield a full-range depth profile.

15. The method of claim 14, wherein misaligning the sample and reference beam optical path lengths further comprises adjusting at least one of a tilt angle and an axial displacement of the non-polarizing beam splitter.

16. A method for obtaining a Dual Detection Frequency Domain-Doppler Optical Coherence Tomography (DD-FD-DOTC) image of a sample, comprising:

providing a swept source output having a central wavelength, λ;

splitting the swept source output with a fiber coupler and propagating the split output via a non-free-space-based wavelength into a sample beam and a reference beam;

coupling the sample beam and the reference beam into a free-space-based interfering portion;

superimposing the sample beam and the reference beam with a non-polarizing beam splitter into a first sample beam $S_1$ having a first sample beam optical path length $L_{S1}$, a second sample beam $S_2$ having a second sample beam optical path length $L_{S2}$, a first reference beam $R_1$ having a first reference beam optical path length $L_{R1}$, and a second reference beam $R_2$ having a second reference beam optical path length $L_{R2}$, in a sample beam path and a reference beam path such that $S_1$ and $R_1$ comprise a first interfering beam path and $S_2$ and $R_2$ comprise a second interfering beam path;

providing a first detector in the first interfering beam and a second detector in the second interfering beam path;

creating a π/2 phase shift in the interfering $S_1$ and $R_1$ beams detected by the first detector and the interfering $S_2$ and $R_2$ beams detected by the second detector, and simultaneously detecting the interference signal in the first detector and the interference signal in the second detector, wherein the step of creating the π/2 phase shift comprises misaligning the sample and reference beam optical paths such that $[(L_{S2}-L_{R2})-(L_{S1}-L_{R1})]=\lambda/4$, further wherein the two detected spectral interference signals having the π/2 phase difference therebetween represent the real and imaginary components of the complex spectral interference signal;

Fourier transforming the complex spectral interference signal to yield a full-range-depth profile; and calculating a Doppler phase shift from the phase difference between two consecutive full-range depth profiles acquired at the same location of the sample beam.

17. The method of claim 16, wherein misaligning the sample and reference beam optical path lengths further comprises adjusting at least one of a tilt angle and an axial displacement of the non-polarizing beam splitter.

18. A full-range Polarization-Sensitive-Optical Coherence Tomography (PS-OCT) apparatus, comprising:

a swept source having a central wavelength output, a swept source output splitting component that can split the swept source output into a sample beam S and a reference beam R; and a free-space-based sample beam and reference beam interfering portion further comprising:

a first non-polarizing beam splitter disposed at a point where the sample beam and the reference beam coincide that creates a first interfering sample and reference beam path $S_1R_1$ and a second interfering sample and reference beam path $S_2R_2$;

a first polarizing beam splitter disposed in the first interfering sample and reference beam path $S_1R_1$ such that a first P-polarized interference signal is generated and a first S-polarized interference signal is generated;

a first detector disposed to detect the first P-polarized interference signal;

a second detector disposed to detect the first S-polarized interference signal;

a second polarizing beam splitter disposed in the second interfering sample and reference beam path $S_2R_2$ such that a second P-polarized interference signal is generated and a second S-polarized interference signal is generated;

a third detector disposed to detect the second P-polarized interference signal; and a fourth detector disposed to detect the second S-polarized interference signal;

wherein the first non-polarizing beam splitter has an adjustable rotational axis and an adjustable displacement axis such that at least one of the rotational axis and the displacement axis have a respective value $\theta\neq 0$, $\delta\neq 0$, such that the sample and reference beam optical paths are misaligned, further such that there is a π/2 phase difference between the first P-polarized interference signal at the first detector and the second P-polarized interference signal at the third detector, and there is a π/2 phase difference between the first S-polarized interference signal at the second detector and the second S-polarized interference signal at the fourth detector.

* * * * *

UNITED STATES PATENT AND TRADEMARK OFFICE
CERTIFICATE OF CORRECTION

PATENT NO. : 8,363,225 B2  
APPLICATION NO. : 13/006535  
DATED : January 29, 2013  
INVENTOR(S) : Rolland et al.

It is certified that error appears in the above-identified patent and that said Letters Patent is hereby corrected as shown below:

In the Claims

Column 23, claim 8, line 49, "(L(subscript)S1- (subscript)LR1)" should appear as "(L(subscript)S1 - L(subscript) R1)". At column 24, claim 9, line 38, "[(L(subscript)S2 – (subscript)LR2)-( L(subscript)S1 – (subscript)LR1)]" should appear as "[(L(subscript)S2 – L(subscript)R2)-(L(subscript)S1 – L(subscript)R1)]". At column 25, claim 16, line 41, add "path" between "beam" and "and". In column 26, claim 16, line 13, insert the symbol --λ-- after "wavelength output".

Signed and Sealed this  
Eleventh Day of February, 2014

Michelle K. Lee  
*Deputy Director of the United States Patent and Trademark Office*